United States Patent [19]

Wilkus et al.

[11] Patent Number: 4,973,626

[45] Date of Patent: Nov. 27, 1990

[54] CROSSLINKED POLYMER INTERDISPERSIONS CONTAINING POLYOLEFIN AND METHOD OF MAKING

[76] Inventors: Edward V. Wilkus, 27 Woodmere Dr.; Alexander F. Wu, 33 Melrose Ave., both of Trumbull, Conn. 06611

[21] Appl. No.: 496,295

[22] Filed: Mar. 20, 1990

Related U.S. Application Data

[60] Continuation of Ser. No. 182,886, Apr. 18, 1989, Pat. No. 4,945,132, which is a division of Ser. No. 679,144, Dec. 16, 1984, Pat. No. 4,758,627, which is a division of Ser. No. 427,213, Sep. 29, 1982, abandoned.

[51] Int. Cl.$^5$ .................... C08L 59/02; C08L 67/00; C08L 77/00; C08L 71/04
[52] U.S. Cl. .................................. 525/104; 525/146; 525/151; 525/154; 525/148; 525/166; 525/179; 525/905
[58] Field of Search ............... 525/104, 146, 154, 166, 525/151, 179, 905

[56] References Cited

U.S. PATENT DOCUMENTS

| | | | |
|---|---|---|---|
| 4,391,951 | 7/1983 | Scheetz | 525/166 |
| 4,714,740 | 12/1987 | Lee et al. | 525/179 |
| 4,724,251 | 2/1988 | Rock | 525/104 |
| 4,749,752 | 6/1988 | Youlu et al. | 525/146 |
| 4,837,275 | 6/1989 | Chu et al. | 525/104 |

Primary Examiner—Carman J. Seccuro

[57] ABSTRACT

Polybend interdispersions of two or more different polymers formed at least partially in the presence of an interdispersing aid which can be polytetrafluoroethylene or ultra high molecular weight polyethylene; said blend can be chemically cross-linked with peroxides.

10 Claims, No Drawings

CROSSLINKED POLYMER INTERDISPERSIONS CONTAINING POLYOLEFIN AND METHOD OF MAKING

This application is a continuation of prior U.S. application: Ser. No. 182,886, filed Apr. 18, 1989, now U.S. Pat. No. 4,945,132, which is a division of application Ser. No. 679,144 filed Dec. 16, 1984, now U.S. Pat. No. 4,758,627, which is a division of Ser. No. 427,213, filed Sep. 29, 1982, now abandoned.

The present invention relates to polymer interdispersions, related compositions, and to the methods of making same.

BACKGROUND OF THE INVENTION

Homopolymers have properties which are characteristic for each type of polymer.

Low density polyethylene generally has good film forming properties and is generally competitive with other polymeric materials in this application, but it does not have high transparency or clarity in molded applications. By contrast, polystyrene does not have good film forming properties, but it does have good transparency and clarity in molded applications.

There are numerous other illustrations of distinctive sets of physical, electrical, chemical and mechanical properties which are manifested by types of polymers including polyvinyl chloride, polyacetal, polyamides, polyethers, polyolefins, etc., and which are manifested by different species of a polymer type as, for example, nylon 6, nylon 11, nylon 66, etc.

It is sometimes possible to combine properties of different types of polymers or species members by forming blends. Blends may be formed where it is found that the polymers are naturally compatible, i.e., where it is found that one polymer can be mixed with or dissolved in another polymer without the involvement of permanent chemical reaction, but with a resultant intimate uniform intermixing of the two polymers to give an apparent homogeneous composition which does not separate into its ingredient components or segregate during ordinary processing such as heating and conventional forming as by extrusion, molding, etc., and which does not segregate after processing with ordinary use or aging. Naturally occurring blends may exhibit combinations of properties which are greater than the average of the blend ingredients for the proportions of the ingredients in the blends.

The compatibility of different polymers occurs naturally for certain polymers and species members. For example, polyphenylene oxide polymer is naturally compatible with polystyrene, both of which are glassy-type polymers. The polyphenylene oxide and polystyrene are the principal ingredients of the family of polymeric materials in different proportions which are available from the assignee of this application under the trade designation NORYL ®.

By naturally compatible is meant that the compatibility is evident and persistant from blending which occurs readily with conventional heating and mixing and without any modification of the ingredients of the blend and without any specific blending agents, although conventional additives such as antioxidants, coloring agents, etc. may be included.

Naturally occurring polymer blends, such as those of the NORYL family of polymers, may exhibit a single apparent thermodynamic response when subjected to calorimetric measurements in which specific heat is measured as a function of increasing or decreasing temperature. Where such a single apparent thermodynamic response is found for a blend of polymers, it indicates that the constituents are alloyed or dissolved in each other. The apparent thermodynamic response of a true alloy is generally proportional to the proportions of the constituents of the alloy.

Such exhibition of a single apparent thermodynamic response is the exception inasmuch as the polyphenylene oxide and the polystyrene constituents of these compositions are true blends in that the constituents are present as true solutions or alloys and the formation of true solutions of distinct types of polymers is rare and unique. For such a true solution or alloy, the apparent thermodynamic response is also distinct from that exhibited by a mixture of two types of polymers which are not naturally compatible and which do not form true solutions or alloys.

Mixtures of polymers into pseudo alloys or pseudo solutions can be detected by calorimetric measurements and are found to exhibit the separate changes in the specific heat curve which is representative of the separate and unalloyed ingredients which are present.

As used herein, the term alloy blends or solution blends is meant to indicate the types of blends which exhibit the unique set of apparent thermodynamic behaviors as discussed immediately above with reference to the NORYL ® family of natural blends.

By contrast, the term polymer blends or blends is meant to refer to compositions which, even when in very intimate state of intermixing at or near a molecular level, are not known to exhibit such distinct and unique apparent thermodynamic behavior as that exhibited by alloy blends or true blends such as NORYL ®. However, the term blends as used for combined or mixed polymers is not intended to mean that a molecular level of intermixing is achieved or even achievable for a combination of polymers which are mixed. The degree of mixing which is achieved for a given level of mixing effort or energy expended is largely dependent on the affinity of one polymer of a mixture for the other polymer or polymers of the mixture. For most polymer combinations, the affinity or compatibility factor prevents a very intimate or molecular level of mixing to be achieved with the level of mixing attainable by conventional industrial polymer procesing and mixing equipment.

Generally, such blends or mixtures of different types of polymers are not readily formed and the properties of such blend compositions as can be formed have not brought such compositions into prevalent use in the plastic industry. A higher level of blending does occur among different types of rubbers and some blends are formed and used commercially in the rubber industry.

Generally also, the blends of different types of polymers with rubbers are not readily formed to produce products having commercial utility.

As used herein, the term polymer or resin is intended to include both naturally occurring and synthetic polymers and, accordingly, to include natural and synthetic rubbers, and polymers such as polyolefins, polyamids and other synthetic resins.

Also in general, the affinity of one polymer type for another type in the sense of the degree of blending or dispersing which can be attained will depend on numerous compatibility or incompatibility factors, such as chemical formula, chemical architecture, molecular weight, polarity, degree of crystallinity, rheological properties, first and second order thermodynamic responses, including melting point and glass transition temperature, as well as on other factors.

An important element in the properties which are exhibited by a blend of polymer materials is the degree of intermixing which is achievable and achieved and the intimacy of the contact of one polymer material with another in a mixture or blend. This degree of intermixing depends as indicated above on the affinity of two polymer materials for each other based on numerous factors discussed above and also on the energy expended in causing the intermixing. Intermixing factors include the temperature of processing, the level of shear developed, the pressure on the system, the time of processing and several other factors. It also depends on the presence of mixing or blending aids.

The term dispersion as found in technical materials dictionaries refers to material systems having two materials present in different phases, one of which, as for example liquid, is continuous and the other of which, as for example gas or solid, is discontinuous. However, according to Webster, the term disperse means "to break up and scatter in all directions; spread about; distribute widely", along with alternative definitions. Webster defines a dispersion as "a dispersing or being dispersed" also along with alternative definitions.

As used herein, the term interdisperse and its derivatives such as interdispersion, means the action of breaking up and scattering of at least one polymer material into at least another and distinct polymer material, while at least one of the polymer materials is undergoing flow, which results in internal shear. The term interdispersion also means the product of the action. At least two distinct polymer materials are involved in formation of an interdispersion and the composition contains also the dispersed fibrous interdispersing agent of this invention.

Surprisingly, it has now been found that certain agents are uniquely adapted to enhance the dispersing of a first polymer into a second polymer to form a multipolymer interdispersion of any desired degree of intimacy of contact of the first and second polymers.

The formation of interpolymer interdispersions pursuant to this invention has been demonstrated to be feasible for polymers which have very little or no affinity for each other.

Polymer affinity factors may be classified according to a number of different groupings. For example, some polymers such as polyethylenes are more highly crystalline and are in a class of more highly crystalline polymers generally having a sharper softening or melting point. Low density polyethylene is about 55 to 60% crystalline and high density polyethylene is over 90% crystalline. Others are classified as glassy polymers and these soften over a wider temperature range. There are essentially no naturally compatible or easily formed binary blends of highly crystalline polymers such as polyethylene with the more glassy polymers such as polyvinyl chloride.

However, more highly crystalline polymers can be interdispersed with the more glassy polymers using the interdispersing agent of this invention. For example, low density polyethylene has been interdispersed pursuant to this invention with polyvinyl chloride, although it is widely recognized in the art that low density polyethylene and polyvinyl chloride are extremely incompatible. By itself, this demonstrated interdispersability of low density polyethylene directly with polyvinyl chloride with the aid only of an interdispersion agent is deemed to demonstrate an extraordinary and remarkable interdispersing capability of the agent. The product formed is an interdispersion of each polymer in the other and the degree of dispersion achievable can make the composition comparable to a blend.

Other polymers are classified in a group of more amorphous materials or rubbery polymers. Generally, members of the amorphous group such as ethylene propylene rubber are not naturally compatible with either the more glassy polymers such as polyvinyl chloride nor with the more highly crystalline polymers such as polyethylene.

An important attribute of the agent is that it permits interdispersing of distinctly different polymers to any desired degree, but at the same time, interlocks the interdispersed polymers as explained more fully below so that they resist separation even though the degree of interdispersion is less than at the molecular level and, in fact, low on a relative basis, i.e., relative to the tendency of the components of a mixture to separate responsive to separating influence such as selective solvent action.

However, with the aid of the interdispersing agent of this invention, interdispersions of highly crystalline polymers may be formed with the more glassy polymers. For example, ethylene propylene rubber polymer can be and has been blended with high density polyethylene.

Also, the highly crystalline polymers can be blended with the more glassy polymers as, for example, polystyrene, which is a largely glassy polymer, has been interlocked as a blend with Delrin, which is polyacetal and is a highly crystalline polymer.

Also, some polymers are classified as more highly polar and other polymers are classified as non-polar. Generally, more highly polar polymers do not blend readily and naturally with non-polar polymers. However, more highly polar polymers such as polyvinyl chloride may be interdispersed with non-polar polymers such as high or low density polyethylene.

By naturally occurring blends as used herein is meant blends which are formed readily with ordinary and conventional heating and mixing and which persist due to the inherent compatibilities of the components of the blend. Such compatibility may be due to similar molecular and chemical structure. For example, chlorinated polyethylene blends to a degree with natural rubber or with styrene butadiene rubber as pointed out in U.S. Pat. No. 4,262,098.

However, some polymers which may appear to have similar molecular and chemical structure do not blend naturally, i.e., readily with ordinary heating and mixing and without the aid of blending agents. For example, high density polyethylene does not blend readily and easily with low density polyethylene by ordinary and conventional heating and mixing. Nevertheless, high density polyethylene is interdispersable with low density polyethylene at low levels of energy input to form interdispersions with the aid of the interdispersing agent as provided pursuant to the present invention.

It will be understood that the formation of certain blends may be brought about by application of higher energy processing conditions than are ordinarily used and ordinarily preferred in forming polymer compositions.

For example, if high temperature are employed in an effort to blend high density polyethylene with low density polyethylene, it is probably feasible to find a set of blending conditions at which an apparent blend will form. The set of conditions can involve high temperature, high pressure, high level of mechanical energy input or agitation and other high energy inputs.

However, as a general rule, a polymer material has a useful life expectancy which is related to the thermal and other energy history which it has experienced in the processing and fabrication stage. Accordingly, it is desirable generally to process a polymer and fabricate an article from a polymer at a lower set of energy input conditions and particularly at lower temperatures and lower time at temperature in order to preserve as much as possible of the inherent useful life expectancy of the polymer.

To avoid the harsh processing conditions which may be needed to form apparent blends and to gain the advantage of sets of properties which are not available in homopolymers, copolymers have been formed by chemical techniques. Accordingly, to overcome the incompatibility of different polymers, and in order to make compositions available which have combinations of properties which are not found in any of the individual polymers, chemical combinations of different monomers are made under suitable polymerization conditions to form copolymers.

For example, ethylene monomer, principally used in making polyethylene, and propylene monomer, principally used in making polypropylene, can be copolymerized under suitable conditions to make ethylene-propylene copolymer or ethylene-propylene rubber.

Similarly, the monomers used in making polyacrylonitrile, polybutadiene and polystyrene as distinctive individual polymers can be copolymerized to form ABS copolymer, or acrylonitrile-butadiene-styrene copolymer.

Generally, a different set of polymer properties are obtained in the copolymers formed by copolymerization of the distinct monomers in combination than are obtained by separately polymerizing the individual monomers to their respective homopolymers. For example, while neither polyethylene nor higher molecular weight polypropylene has distinctly rubbery properties, some ethylene propylene copolymers have distinctly rubbery properties.

The cost of copolymers is generally substantially higher than the cost of the homopolymers made from the individual monomers.

Polypropylene and low density polyethylene are at best poorly compatible polymer species in that only small percentages, if any, of either one can be blended into the other through conventional blending methods and means. At higher concentrations, the species are incompatible and do not form homogeneous blends.

Surprisingly, it has now been found that using conventional mixing and blending practice and equipment, interdispersions of normally incompatible ratios of polyethylene and polypropylene, is made feasible by the use of a small amount of an interdispersing agent pursuant to this invention.

The number of copolymers which can be formed by copolymerization reactions is limited. This is partly because the polymerization conditions, the polymerization catalysts, and the polymerization mechanism differs for many polymer species. For example, not all monomers, such as olefin monomers which can be polymerized by one of the "addition" type mechanisms, can be copolymerized with monomers, such as esters, which are polymerized by "condensation" type mechanisms.

Accordingly, it is not feasible to form copolymers by copolymerizing all combinations of selected monomers.

Different polymer species, the distinct monomers of which could not be formed into copolymers by presently existing technology, can nevertheless be interdispersed in each other with the aid of the interdispersing agents of this invention to achieve combinations of properties which have not heretofore been available.

Copolymers are prepared commercially in certain preferred monomer ratios to give the copolymer formed preferred combinations of properties. For example, ethylene vinyl acetate copolymer prepared from the ethylene monomer and the vinyl acetate monomer will have a more rubbery set of properties if the ratio of ethylene monomer to vinyl acetate monomer is at one value, for example, 25% of vinyl acetate, and will have a less rubbery set of properties if the ratio of monomers is at another value, for example, 3% vinyl acetate.

However, it is not commercially feasible to alter the ratio of monomers for each specific end use application to which the copolymer may be put. Rather, the commercial product is produced with a certain number of monomer ratios, and the end user must try to adapt the commercially available materials to the end use contemplated. Further, for those set numbers of copolymers which are produced, the supplier and wholesaler must stock all or most of them to satisfy his customer's needs.

However, it is feasible to modify the properties of interdispersions of otherwise poorly compatible or incompatible homopolymers by interdispersing two incompatible polymers with the aid of an interdispersing agent of this invention in any desired or selected ratio of homopolymers, and to achieve the properties which are the result of such interdispersing in any such selected ratio.

Moreover, such dispersing can be achieved without the aid of chemical polymerization equipment and can be accomplished for most binary polymer systems through use of existing and commercially available mixing and processing equipment such as rubber mills, plastic mills, extruders, high intensity mixers and the like.

Accordingly, this invention makes possible the custom interdispersing by the end user of different combinations of polymers to achieve a desired set of properties for particular end uses to a degree not previously possible.

Further, the invention is not confined to the interdispersing of binary sets or combinations of homopolymers, but extends to the interdispersing of tertiary combinations of homopolymers, quaternary combinations of homopolymers, and other multinary combinations of homopolymers in all ratios and proportions. Multinary as used herein means sets of two or more members in combination without limitation as to any upper number of members and includes sets of five or six or more homopolymer members.

In addition, interdispersions of combinations of homopolymers with incompatible or poorly compatible copolymers can be made in binary sets and/or multinary sets without limitations as to the number of members in a set nor as to proportions nor as to the number of homopolymers as contrasted with copolymers in the set. On the same basis, multinary sets of copolymers can be combined and interdispersed in all ratios and proportions.

Another form of copolymer which is even more difficult to produce than the ordinary random copolymer and which is also used in efforts to blend polymers is the block copolymer form. This form has a set of a first monomer species such as "A" polymerized in a first block "AAAAAA" and another set of a second monomer species "B" polymerized in a second block "BBBBBB". Repeating alternate blocks gives the polymer a form which may be represented as follows:

AAAAA BBBBB AAAAA BBBBB AAAAA

One set of such polymers which has been used widely is the set which has alternating blocks of polystyrene and polybutadiene and which are sold commercially by the Shell Oil Company under the designation Kraton.

The Kratons are thermoplastic rubbers and have a combination of thermoplastic properties, due to the presence of the blocks of polystyrene, and rubber properties, due to the presence of blocks of the polybutadiene.

However, pursuant to the present invention, interdispersions of different polymers, such as polystyrene and polybutadiene, can be formed to yield interdispersed compositions having unique sets of properties.

The properties of polymer species occur in sets in the sense that one polymer species has a certain specific density, softening temperature, izod impact, tensile strength and other physical, chemical, electrical, mechanical and thermal properties, all of which are subject to measurement and which can accordingly be quantified. The sets of properties of the different polymers and different members of families of polymers such as the polyolefins have been measured and are known.

It is the current practice in the plastics industry that when a choice is made of a polymer for a particular end use, it is made on the basis of the material and processing cost and on the basis of the appropriateness of a particular set of properties for the intended end use.

When an interdispersion of polymers is made pursuant to the present invention, although the starting sets of properties of each individual ingredient polymer is known, not all of the combination or set of properties which will result from the interdispersing is readily apparent or highly predictable. For example, as is pointed out below in Example 1, a material which is known to have high flexibility, such as a rubber, may be chosen as one constituent of an interdispersion to lend flexibility to the interdispersion. Where increased toughness is sought, a second although normally incompatible constituent may be selected to impart toughness or abrasion resistance to the interdispersion. However, although it is expected that an interdispersion can be formed pursuant to the present invention having some combination of flexibility and toughness properties, there is no way of predicting quantitatively just what properties will result from the intimate interdispersion with the interdispersing agent of this invention of materials which are otherwise incompatible or poorly compatible under a given or a particular set of conditions used in forming a particular interdispersion.

In Example 1, the properties found and reported are not the properties only of the interdispersion of high density polyethylene with ethylene propylene rubber. In fact, almost no properties of this composition were measured although several were observed, i.e., the material handled well and processed well and extruded well as contrasted with the inferior observed properties of the material of Example 2 which did not contain the dispersing agent of this invention, which did not handle well or process well or extrude well.

Considering now the interdispersing agents of this invention, it has now been discovered that very long chain polymers of polytetrafluoroethylene and of polyethylene of very high and ultra high molecular weight exhibit a unique and unexpected behavior in inducing the interdispersion of a first polymer into a second and distinct polymer as the polymers are subjected to a motion which induces shear within the polymers.

The term interdispersion as used herein is meant to include the dispersion of a first polymer into a second polymer as well as the dispersion of the second polymer into the first either simutaneously or sequentially and to include an interdispersion of both polymers into each other simultaneously. For purposes of this invention, either the first and/or second polymer may be a homopolymer, copolymer, or combination of polymers, either naturally occuring blends or combinations of poorly compatible or incompatible polymers induced into interdispersions by the interdispersing agents of this invention.

These interdispersing agents have been found to be effective in combining distinct polymers into interdispersions with a generally lower level of energy input than is needed to form blends which have an equivalent degree of intimacy of contact of the constituents as can be formed in the absence of the interdispersing agents of this invention.

For example, as is pointed out in Example 31 below, it has been found that an apparent blend of polyethylene and polystyrene can be formed on a mill at a temperature of 310° F. However, at 240° F., the same ingredients do not enter an apparent blend to any observable extent. However, at 240° F., the polyethylene and polystyrene can be interdispersed to form a composition which has an appearance on the mill closely resembling the apparent blend formed at the higher temperature of 310° F. The interdispersing agents can also form interdispersions of combinations of polymers which do not form apparent blends at higher energy levels as, for example, at higher temperatures or other higher energy input levels.

As understood by the applicants, the unique ability of the interdispersing agents to form interdispersions of incompatible polymers and to form interdispersions of poorly compatible polymers at lower energy levels is related to the ability of these agents to extend into fibrous form and to disperse through the polymer in this fibrous form as the host polymers undergo internal shearing action by the working or processing of the polymers.

The applicants herein are not the first ones to discover the unique morphology of the polytetrafluoroethylene which has now been discovered by the applicants to be an intrdispersing agent. Nor are they the first ones to discover the influence on a single polymer of fibrous polytetrafluoroethylene.

U.S. Pat. No. 3,132,116 issued in the name of one of the inventors of this application and assigned to the assignee of the subject application, discloses that if a silicone polymer is blended with filler and other conventional ingredients in the presence of a minor amount of tetrafluoroethylene polymer, the characteristic tackiness of the blended mixture is dramatically reduced, and, in addition, that the properties of elastomers derived therefrom are improved, compared to elastomers derived from such mixtures free of polytetrafluoroethylene.

By contrast to the subject matter of the U.S. Pat. No. 3,132,116 which deals only with a treatment of a single polymer, i.e., treatment of silicone polymer with PTFE, the compositions of the present invention comprise at least two polymers of distinct properties to which polytetrafluoroethylene is added, and the interdispersions of these distinct polymers into each other with the aid of the PTFE.

In addition, the PTFE addition has been found to make important changes in the properties of the combined polymers of this invention to which it is added as, for example, the rate at which the interdispersed polymers can be dissolved in comparison to the rate at which a blend or mixture of the same polymers can be dissolved in the absence of PTFE.

A significant advantage of the present invention is that it makes possible for the first time for many binary and other multinary systems of polymers a very effective and efficient means and method for bringing together in very intimate intermixed contact or intimate interdispersions polymers which cannot otherwise be so easily intimately blended and intermixed. To achieve an equivalent degree of intimacy of intermixing would otherwise require expensive or cumbersome or extraordinary means and measures, and as is pointed out above, such extraordinary measures can detract from the combined properties of the polymers which are combined.

It should be pointed out that because of the fibromorphous character of the dispersing agent of this invention, the dispersions which are formed have coherency and integrity of structure even though the extent of interdispersion is brought to an optimum degree.

Generally, an optimum degree of dispersion can be achieved in a relatively short processing time, which may be of the order of minutes or hours, depending on the degree of internal shear induced in the polymers. For the processing of a relatively small quantity of a combination of polymers as, for example, low density polyethylene and PVC on a small plastic mill, each of which polymers is millable at the time of processing, an effective interdispersion can be achieved in a period of about 10 minutes and a higher degree of interdispersion can be achieved in 20 or 30 minutes where the degree of interdispersion is measured by rate of burning of a horizontal strip of the product interdisperion. Clearly, however, the degree of interdispersion can be controlled as, for example, by controlling the time and temperature of milling and intensity of agitation.

An optimum degree of interdispersion is deemed to result in an intimate contact of the different polymers at a level approaching a molecular level although the applicants have no direct evidence of such molecular level of contact and do not wish to be bound by the accuracy of this prognosis.

But the inventors have found that for numerous compositions which have been formed on a mill, for example, without the dispersing agents of this invention, the milled mixture does have less coherency and integrity when processed under a given set of conditions for a given time and temperature as compared to the coherency and integrity of a composition of the same ingredients processed under the same set of conditions for the same time with the aid of an interdispersing agent of this invention.

This rapid development of integrity of a composition of two normally incompatible polymers is dramatically demonstrated when quantities of the two polymers are placed on a mill and subjected to milling action for a given period of time. As illustrated by the examples below, where the two polymers are milled for a given time and temperature, frequently there is no evidence of interdispersing of blending or intimate mixing of the two polymers.

If a first half of the milled composition is then removed from the mill and the dispersing agent of this invention is added to the second half of the composition remaining on the mill, a very rapid and dramatic interdispersing of one polymer into the other will be observed in the second half of the composition.

If this second half polymer dispersion is then removed from the mill and the first half of the composition, free of the dispersing agent, is returned to the mill, it will be observed that the milling can be continued for a significant time beyond that which resulted in formation of the interpolymer dispersion of the second half composition containing the dispersing agent.

OBJECTS OF THE INVENTION

It is accordingly one object of the present invention to provide broad spectrum interdispersing agents for dispersing normally incompatible and poorly compatible polymer materials, including organic and inorganic polymers.

Another object is to provide a broad spectrum method for dispersing normally incompatible and poorly compatible polymer materials including organic and inorganic polymers.

Another object is to provide novel compositions comprising a broad spectrum of interdispersions of normally incompatible and poorly compatible polymer materials, including organic and inorganic polymers and polytetrafluorethylene dispersing agent.

Another object is to provide articles incorporating at least one of a broad spectrum of interdispersions of normally poorly compatible or incompatible polymer materials, including organic and inorganic polymers.

Another object is to provide a method to enhance the homogeneous incorporation into polymer base materials of higher concentrations of certain polymer additives, the incorporation of which is restricted because of poor compatibility.

Another object is to provide homogeneous polymer base material having polymeric additives therein in higher concentrations than normally feasible based on limited compatibility of the polymer of the additive and the polymer of the base material.

Another object is to provide articles made of polymer base materials homogeneously blended with polymeric additives which are normally poorly compatible with the base material.

Another object is to include curing agents in the curable novel compositions of the present invention.

Another object is to provide curable novel compositions of the present invention and to cure such compositions.

Another object is to provide novel articles which include cured novel compositions of the present invention.

Another object is to provide molded articles which include the novel compositions of the present invention.

Another object is to provide injection molded articles which include certain novel compositions of the present invention.

Another object is to provide novel sheet articles which include certain novel compositions of the present invention.

Another object is to provide novel film products incorporating the novel compositions of the present invention.

Another object is to provide novel filament and fiber products incorporating novel compositions of the present invention.

Still another object is to provide polymeric additives containing polytetrafluoroethylene dispersed therein, which additives can be easily blended and dispersed in relatively low percentage concentrations into different polymers.

Another object is to make possible the incorporation into polymer base materials of polymeric additives which are not normally incorporable because of incompatibility of the polymer base of the additive and the polymer base of the material.

Another object is to provide polymer base compositions having polymeric additives homogeneously interdispersed therein, which additives are normally incompatible with the polymer base composition.

Another object is to provide articles which include polymer base compositions having polymer base additives homogeneously interdispersed therein, which additives are normally incompatible with the polymer base of the composition.

Another object is to provide novel compositions comprising a multinary set of polymers dispersed together with the aid of finely fibrous polytetrafluoroethylene, ultra high molecular weight polyethylene, or high molecular weight polyethylene and combinations thereof.

Another object is to interdisperse together in a single step combinations of three or more polymers, which under conditions which have required more than one step heretofore, by including in the single interdispersing step the dispersion of finely fibrous polytetrafluoroethylene, ultra high molecular weight polyethylene or high molecular weight polyethylene into the contituents of the blend.

Other objects and advantages will be in part apparent and in part pointed out in the description which follows.

BRIEF SUMMARY OF THE INVENTION

In one of its broader aspects, objects of the invention may be achieved by dispersing polytetrafluoroethylene, ultra high molecular weight polyethylene or high molecular weight polyethylene in fine filamentary form into a multinary set of poorly compatible and/or incompatible polymers to form an interdispersion of the polymers to a desired degree of intimacy of contact of the interdispersed set of polymers.

Novel compositions may be formed pursuant to the present invention and comprise two or more poorly compatible or incompatible polymers containing an amount of fibrous polytetrafluoroethylene, ultra high molecular weight polyethylene or high molecular weight polyethylene effective to at least partially interdisperse the polymers together.

In another of its aspects, the objects may be achieved by providing a secondary treatment for a composition containing two interdispersed polymers with fine filamentary polytetrafluoroethylene, ultra high molecular weight polyethylene or high molecular weight polyethylene dispersed therein.

DETAILED DESCRIPTION

It has been discovered that normally incompatible and, accordingly, normally unblendable polymers may be interdispersed with the aid of conventional polymer processing apparatus and methods which generate internal shearing action in the polymers where a relatively small concentration of polytetrafluoroethylene is incorporated in fibrous form in the polymer materials being processed.

It has now been discovered that two polymers which are not normally blended when heated and mixed in conventional equipment used for this purpose at a given set of conditions can be made to interdisperse to a desired degree of intimacy of contact by the addition of a small amount of polytetrafluoroethylene to the material and by the same conventional heating and mixing equipment under the same set of conditions.

The ability of the polytetrafluoroethylene to induce the interdispersion of polymer materials which are not normally blendable under given conditions in conventional heating, mixing and blending apparatus appears to be related to the formation of fine fibers or filaments of the polytetrafluoroethylene as the material is being heated and agitated, mixed to form an interdispersion in such conventional apparatus.

When most thermoplastic materials are heated, their state is changed from the more solid state in which they are normally used in conventional articles to a more plastic state in which they can be made to flow under the stress applied by the apparatus in which they are processed. The result of flow of one layer of polymer over and against another layer is a shearing action within the body of the polymer material itself, and this shearing action can be of different degrees of intensity depending on the state of the polymer and the level of energy employed in causing differential relative movement of the portions of polymer being processed. It is this shearing action of the polymer while in the plastic state which is responsible for such agitation as forms blends of compatible or normally blendable materials.

It has been observed that powdered polytetrafluoroethylene or PTFE when added to fluxing polymer on a roll mill tends to be stretched out into filamentary or fibrous form.

Such stretching out of PTFE into fibers when undergoing shear in an organopolysiloxane has been described in the prior art. The U.S. Pat. No. 2,710,290 to the same assignee as the subject application describes the formation of fibers of PTFE in silicone polymers. According to this patent, compositions of organopolysiloxane polymer and the polytetrafluoroethylene particles which have been sheared into fibers are said to have improved tear strength.

It has been observed by the applicants that a bead of polymer in the nip of the rolls of a small plastic mill has a generally round and undisturbed surface when a polymer which is free of PTFE is fluxing on the mill. However, when this same bead of polymer is observed after the addition of PTFE, there is a distinct tendency for longitudinally oriented folds or nodes to form in the upper surface of the bead and there is a distinctive formation of filaments of PTFE which bridges the nodes and appear to the unaided eye as fibers.

The powdered polytetrafluoroethylene or PTFE material used in connection with this invention is a fine powdered polytetrafluoroethylene which is currently commercially available from the E.I. Du Pont de Nemours and Company of Wilmington, Del., hereafter referred to as Du Pont Company, under the trade designation Teflon 6, also sometimes abreviated as T-6.

The Teflon 6 material may have some similarities, based on similarities of its observed behavior in homopolymers, such as high density or linear polyethylene, to a polytetrafluoroethylene described in a U.S. Pat. No. 3,005,795 assigned to the same Du Pont Company. Polytetrafluoroethylenes and other fluorocarbons which are not susceptible to the formation of the extensive fibrous filaments and which do not accordingly undergo fillibration are not deemed to be interdispersing agents which form interdispersions of distinct polymers pursuant to this invention. While it is not known whether the polytetrafluoroethylene which was obtained from the Du Pont Company under the trade designation Teflon 6 corresponds in its structure and manifestations to that described in the Du Pont patent, the Applicants here have found the Teflon 6 to be effective as an interdispersing agent as described above and as set forth in the examples below and have associated the ability of the Teflon 6 polytetrafluoroethylene to be dispersed in fibrous form in polymeric media with the changes in properties manifested by the media, including the intimate interdispersing together of polymers under conditions under which they would not blend or otherwise combine into a homogeneous composition.

It has further been observed that the fibrous nature of the polytetrafluoroethylene interdispersing agent causes a binding together of the interdispersed polymers when they are in the early stages of interdispersion. For example, it has been observed that when two incompatible polymers are interdispersed with the aid of the polytetrafluoroethylene and the material is stretched into a sheet or film when the degree of dispersion is of a lower order, there is a tendency of the material to display a network of fibers and quasi particles. The particles are not clearly identifiable as such, but appear to be closely linked and somewhat conforming to adjacent particles. However, at an early stage of the interdispersing, the polymers being interdispersed may display a much lower resistance to being stretched in a direction generally perpendicular to the "machine" direction, that is, the direction in which the material is initially being worked and stretched into film, as on a plastic mill. Further, the stretching normal to the machine direction can result in opening up of seams in the sheet material and very close observation of such seams will reveal an extensive array of fine fibers which are stretched as the seam is opened.

A subsequent pull on the sheet in the machine direction while in readily workable or plastic state can result in an apparent closing up of the seams and restoration of the appearance of a sheet material.

However, it is deemed evident from this behavior of certain samples of incompatible polymers which are partially interdispersed that the fibers perform an interlocking or binding function in binding together with fibers of the polytetrafluoroethylene the discrete materials of the incompatible polymers.

While such phenomena is observable on a macro scale at an early stage of interdispersion, it is deemed to persist in the micro scale so that the incompatible polymers are not only dispersed into each other, but are effectively interlocked by the fibrous interdispersing and interlocking agent.

Evidence of such interlocking is found when an effort is made to separate the elements of the interdispersion by solvent action.

In this connection, as pointed out in Example 31B below, an apparent blend of polyethylene and polystyrene formed by heating and mixing these polymers at 310° F. was readily dissolved in boiling toluene in a period of less than 5 minutes. However, essentially the same composition of polymer ingredients in the same ratio prepared in the same manner at the same temperature but containing 1.8 parts of fibrous PTFE as set out in Example 31B did not dissolve when left in boiling toluene for over an hour and, in fact, about one-third of the composition remained after the boiling in toluene for over an hour.

In fact, it is the concept of the Applicants herein that similar binding together of distinct polymers into a bound or interlocked interdispersion can be accomplished by the other fibromorphous material which have a morphology similar to that of polytetrafluoroethylene and which can be distributed in fine fibrous form into polymer media by the internal shearing action of the polymer strata as the polymer is worked or masticated as it is in milling equipment, high intensity mixing equipment and similar conventional polymer masticating and shearing equipment. Ultrahigh molecular weight polyethylene and very high molecular weight polyethylene are deemed to be such interdispersing agents for forming interdispersions of polymers.

Accordingly, the influence of the finely distributed fibrous agent on polymers is deemed herein to be at least partly a physical phenomena, by which the fibromorphous agent is distributed as fibers by shearing or similar action into finer and finer states of subdivision in diameter while still retaining very long lengths relative to the diameters, and also by which the fine fibers associate with and bind or interlock distinct polymers into an intimate interlocked interdispersion under conditions which such distinct polymers would not form blends or intimate interdispersions. Also, if the set of distinct polymers does at least partially blend, the interdispersing agent interlocks the components of the blend in the relationship discussed above, for example, relating to the reduced solubility of the components of the resultant composition.

The intimate intermixing or interdispersion of extraordinary diverse sets of polymers is an extremely valuable tool in its own right and provides many valuable new compositions of matter which have valuable and persistant combinations of properties as is brought out in the discussion and examples below. Such interdispersion of diverse polymers pursuant to this invention is also valuable because it permits other measures to be taken to preserve and enhance such intimately intermixed compositions or to permanently modify the polymer affinities and/or properties while in such interdispersed state.

For example, in Example 1 below, it is taught that a binary combination of polymers which are not blendable into an intimate admixture employing conventional means can be and have been interdispersed pursuant to the present invention and once they are so blended, they can then be further permanently changed in their relationship by crosslinking.

In the case of Example 1, the crosslinking is of a high degree so as to permanently alter the form of the thermoplastic of the interdispersed composition to a thermoset form. Once the composition is thermoset as taught in Example 1, it is no longer feasible to modify the form of the material, which may for example be in the form of a layer simply by heating and working it in its plastic state. This is because the high degree of crosslinking alters the plastic state of the composition and converts it from the thermoplastic state, which it was in when the layer was formed, to a thermoset state in which the layer will remain during the useful life of the layer.

However, it is evident that a composition such as that of Example 1 which can be crosslinked to a higher degree by including higher percentages of crosslinking agent, can also be crosslinked to a lower degree to induce co-grafting by including lower percentages of crosslinking or co-grafting agents. For example, the composition of Example 1 below contained about 3 parts of crosslinking agent. However, use of lesser amounts of crosslinking agent in the order of 1 part or 0.5 parts, as taught in Example 36, or 0.1 part or 0.001 part or less to induce co-grafting is also feasible.

By co-grafting as used herein is meant the chemical linkage of a first molecule of one polymer of an interdispersion to a different molecule of a second polymer of the same interdispersion so that the two distinct molecules are chemically linked or grafted. A crosslinking agent such as a peroxide can be a co-grafting agent when present in an interdispersed polymer composition such as that provided by the present invention in a concentration which permits the chemical binding of the different molecular species without depriving the blend of its thermoplastic properties. In this co-grafting application, the use of the PTFE interdispersing agent is deemed to be preferable to the use of the ultra high molecular weight polyethylene or very high molecular weight polyethylene interdispersing agents because the PTFE agent is less likely to enter a crosslinking reaction with other polyolefins of the interdispersed composition.

Further, the present invention is not limited to secondary treatment of the novel compositions of this invention as by peroxide crosslinking.

Other crosslinking or co-grafting agents and crosslinking means may be employed. For example, radiation crosslinking or radiation co-grafting may be employed and the radiation crosslinking can be done at different levels to impart a higher or lower degree of crosslinking or co-grafting to the intimately intermixed and interdispersed compositions of the present invention. For co-grafting the ratio of polymer molecules in a binary interdispersion is preferably about 50/50 so that the probability of grafting a first polymer type to a second polymer type by the co-grafting is high.

In addition, in the secondary treatment of interdispersions of this invention, other crosslinking methods, agents and systems can be employed as, for example, the crosslinking according to the commercial process known as the Sioplas process as shown in Examples 37, 40 and 41 below.

Accordingly, one feature of this invention is to provide a primary intimate admixture and interdispersion of normally incompatible or poorly compatible polymer materials with the aid of fibrous PTFE as described in the examples below and to then subject the interdispersion to a secondary treatment, such as the co-grafting or partial crosslinking secondary treatment also described in the Example 36 below to alter and modify the properties of the interdispersed ingredients and of the interdispersed composition.

In the secondary processing of primary interdispersions prepared to contain the fibrous PTFE, one object is to take advantage of the fact that the primary interdispersion in fact exists for the first time or exists at temperatures and under conditions at and under which such compositions had not previously existed.

For example, it had not previously been feasible to interdisperse polyethylene and polypropylene in an intimate and enduring interdispersion. Because such a composition can be prepared in any proportion pursuant to the present invention, the secondary processing of such primary interdispersions has now become feasible pursuant to the present invention. It is now possible to apply a wide variety of secondary treatments to such primary interdispersions also pursuant to the present invention.

One very important difference in the secondary treatment is the possible application of dynamic secondary treatment under conditions not previously available. For example, since polyethylene and polypropylene could not be interdispersed or blended into apparently homogeneous compositions at conventional processing conditions in all proportions previously, the present invention makes possible the secondary processing of such a primary interdispersion while the interdispersion is being fluxed in conventional processing equipment. For example, a primary interdispersion of a polyethylene and polypropylene in a 50/50 ratio, or of other similar interdispersions of the present invention on a mill roll may be subjected to intensive radiation, such as ultra-violet or other photoradiation, while it is banded on a roll and is being fluxed on the roll.

Similarly, such a primary interdispersion can be included in a high intensity mixer and can be heated in the mixer to induce reaction with a chemical co-agent, such as the triallyl cyanurate agent used in several of the examples below, with peroxide co-grafting agent. A co-agent, such as triallyl cyanurate, is one which assists and enhances the crosslinking which is induced by a crosslinking agent, such as peroxide, in a polymer to be crosslinked, such as a polyolefin polymer.

One feature of the present invention which must be appreciated to recognize the extraordinary breadth of primary and secondary processing is that the PTFE interdispersing agent used in forming many primary blends of this invention is one of the most chemically inert materials known to polymer science.

Because of the inertness of the fibrous PTFE, a very wide variety of crosslinking, co-grafting and other agents and methods can be employed without impairing the effectiveness of the fibrous PTFE as a primary interdispersing agent.

U.S. Pat. No. 3,005,795 patent to Du Pont teaches that the application of very high levels of radiation of the order of $10^6$ rep. or more of 2 mev. electron radiation directly to PTFE prior to filibration of the PTFE changes the fiber forming properties of the PTFE. Such high irradiation of the fiber forming PTFE can, according to the U.S. Pat. No. 3,005,795 patent, lead to degradation of the PTFE and reduce the effectiveness of the PTFE in modifying the properties of the single polymers. However, pursuant to the present invention, such secondary treatment as radiation as by high speed electrons can beneficially co-graft distinct polymers which are first formed into a primary interdispersion with the aid of the fibrous PTFE, particularly, in a dynamic mode as discussed above, e.g., while fluxing on a mill, high intensity mixer, etc.

Accordingly, if some deterioration of the primary interdispersing agent occurs as the interdispersion is made more permanent and persistant by the application of secondary processing, the net result can be an interdispersion having a more desirable set of properties based on chemical linkage of the diverse molecular components of the interdispersion, even though the agent which made the primary interdispersion possible is involved in or even impaired by the secondary processing. For example, the high molecular weight polyethylene and ultra high molecular weight polyethylene interdispersing agents of this invention can be expected to enter into the crosslinking phenomena occurring in an interdispersion when a peroxide crosslinking agent is employed to crosslink two polyolefins such as ethylene propylene rubber and low density polyethylene as set forth in Example 53 below.

For a great number of combinations of polymers, it has simply not been feasible heretofore to attempt secondary processing to improve the properties and permanence of a primary blend because without the present invention, the formation of the primary blend under a favorable set of conditions as a very intimate and persistant admixture of diverse polymers, which primary blend can undergo very extensive processing while retaining its primary blend integrity, has not been feasible by any other known manner or means. However, such secondary treatment of combinations of extremely diverse polymers is made possible pursuant to the present invention because it is possible to form such very intimate and persistant admixtures as interdispersions by use of the interdispersing agents of the present invention.

Another advantage of the interdispersed polymeric compositions of the present invention is that the interdispersions of sets of distinct and diverse polymers may be formed although the concentration of the fibrous PTFE necessary to form such interdispersed polymeric compositions is so surprisingly low. The 1.8 parts of PTFE used in most examples below is not a lower limit of PTFE, but was adopted to provide a basis for comparison of results obtained in interdispersing different sets of polymers and is not intended to indicate a minimum, maximum or optimum concentration of PTFE for any intended purpose or for any polymer interdispersion system where polymer interdispersion system as used here is intended to include a multinary combination of distinct polymers in any set of proportions and with any concentration of dispersed fibrous PTFE.

Concentrations of interdispersing agent from a very low fractional percentage of 0.001% or less to percentages which can be accepted by a composition, without loss of desirable properties of a composition and ranging up to 20% and higher, can be employed as disclosed in Example 27C is within a desirable range.

Where concentrates are employed higher percentages up to about 35% of PTFE dispersed within an interdispersion of polymers is contemplated as an operable upper range.

Because of economic factors, i.e., the cost of the interdispersing agent such as fibrous PTFE, it is preferred to employ only enough of such an interdispersing agent to accomplish the degree of interdispersion of which is necessary for a particular application. From the examples below, it is evident that to form most interdispersions of distinct polymers in a 50/50 ratio, a concentration of the PTFE fibrous interdispersing agent of less than 2% is sufficient.

Where the ratio of polymers interdispersed is lower, i.e., 20/80; 10/90; 30/70, etc., and the interdispersing agent can be effectively included in the polymer present in the lower concentration, an overall concentration of interdispersing agent well below the 2% level can be employed and still achieve sufficient interdispersion. For example, if a 5% concentration of PTFE is first included into a polymer ingredient such as silicone rubber and the silicone rubber is to be interdispersed into a polyolefin containing no PTFE dispersed therein in a ratio of 10 parts of silicone rubber to 90 parts of polyolefin, then the concentration of the PTFE in the final composition will be at approximately 0.5% level.

Accordingly, an operable range of PTFE in a polymer interdispersion will vary from a small fractional percentage to about 35%. Ultra high molecular weight polyethylene should be employed in higher concentrations of the order of three or four fold higher than PTFE to achieve the similar effect as an interdispersing agent and the high molecular weight polyethylene should be employed in still higher concentrations, approximately 50% higher than the ultra high molecular weight polyethylene interdispersing agent.

The concentration of fibrous PTFE for interdispersing distinct polymers can be substantially lower for some systems which do have some compatibility and blendability at a desired set of conditions and can improve and enhance such blending as taught in Example 26 below.

Another advantage of the fibrous PTFE interdispersing agent of this invention is that it is to a large extent non-fusible and compositions containing the fibrous PTFE can be heated to relatively high temperatures, particularly after the fibrous dispersion of PTFE has been formed without causing degradation of the PTFE.

The use of fibrous PTFE is deemed to vary with the polymer interdispersion system in which it is used so that an optimum concentration for one system can be at one concentration, and the optimum for a different system can be at another concentration. See in this respect Example 27 below dealing with the different concentrations of PTFE which are incorporated in different polymers, such as natural rubber and high density polyethylene, and the startlingly different concentration of PTFE which can be absorbed into a 50/50 interdispersion of natural rubber with high density polyethylene.

In the processing of polymers, it is preferred to process at as low a temperature as is consistent with obtaining the results which are desired. Generally speaking, there is an advantage in processing polymers at lower temperatures partly because exposure of plastic or polymer material to higher temperatures can initiate the degradation processes to which most polymers are subject and, accordingly, shorten their useful lives.

Accordingly, there is an advantage in the case, for example, of polyvinyl chloride of forming an interdispersion of the polyvinyl chloride with a low density polyethylene at a temperature in the range of about 280° F. rather than at higher temperatures such as 350°–400° F. at which the polyvinyl chloride is conventionally blended as with chlorinated polyethylene. This interdispersion of the polyethylene with the polyvinyl chloride is an example which is given below, see Example 20 and others, and is illustrative of the examples of the processing of materials at a lower temperature with the aid of one of the interdispersing agents of this invention, specifically, the fibrous polytetrafluoroethylene.

For example, in the processing of some polymers at higher temperatures, there is a scission which occurs in the polymer to reduce the molecular weight of the polymer into lower molecular weight molecules. It is known, however, that the properties of a polymer are related to the molecular weight and that the higher molecular weight materials do have different properties than the lower molecular weight polymers.

Accordingly, by use of the interdispersing agent of the present invention as taught in the examples below, the advantage of being able to process and combine such polymeric materials at lower temperatures is made available.

It has been demonstrated, for example, that polyvinyl chloride can be interdispersed in polyethylene with the aid of the interdispersing agents of this invention at a temperature about 100° F. below the temperature at which the polyvinyl chloride can normally be processed to a blend as with chlorinated polyethylene.

FIBROUS MASTICATION

One question which is raised by the interdispersing of the polyvinyl chloride particles into the polyethylene with the aid of Teflon 6 at a temperature of about one hundred degrees below the temperture at which the PVC can be blended without Teflon 6, is the question of the mechanism by which it happens. How does the small percentage of Teflon 6 induce the dramatic change in the processing temperature of the PVC powder?

While the applicants do not wish to be bound by the accuracy of the explanation which is given here, the explanation is offered to assist in visualizing by analogy a phenomena which is believed to take place progressively in finer and finer degrees of subdivision starting with the particles of Teflon 6 powder, which are visible in bulk to the unaided eye, and proceeding down in size scale to the fine strings and threads which are also visible to the unaided eye spanning the folds or nodes in the beads of polymer fluxing in the nip of a small laboratory mill. Careful observation of these strings, which are arrayed in parallel across each node in harp-string formation by means of a low power magnifying glass, reveals that they are not single threads, but web networks of threads in filigree formation likely enmeshing host polymer material incorporated and suspended in the webs. U.S. Pat. No. 3,005,795 referred to above sets forth the observations that the fibers of the PTFE-A referred to in the patent subdivides progressively from large bundles of fibers to smaller and smaller bundles and into a size domain below the resolving power of the optical microscope.

It is the Applicants conception and understanding of the morphology of the fibrous PTFE that as its fibers are progressively subjected to shearing action of a host polymer, the fibers of the PTFE which are formed under conditions which give them extraordinary length, will continue to unravel from their progressively smaller diameter bundles until they have passed through and below the resolving power of the scanning electron microscope and become ultimately single extra-long molecules.

A molecule of such extraordinary length is uniquely able to interact with molecules of the host polymer partly because of its unique length. On a statistical basis, an average Teflon 6 molecule is believed to be far longer than an average molecule of almost any host polymer in which it is likely to unravel to its monomolecular form. The Teflon 6 molecule is estimated by Fred Billmeyer in his book "Textbook of Polymer Science", 2nd Edition, published in 1962 by John Wiley & Sons of New York, to have a molecular weight of many millions.

The fibromorphous transition of PTFE which accompanies shear in polymers or other fluid media can accordingly, by this mechanism, be seen to be a way of concentrating a very high degree of energy on a particle captured in the polymer undergoing fluxing.

Even though PTFE is acknowledged in most references on polymers to be the most lubricious of all polymer species, and the exhibition of this macro property may reasonably be thought to emanate from the display of similar property on a micro scale, and even down to the monomolecular scale, it is nevertheless the phenomenal length of the monomolecular filament and of the filament bundles constructed from such macromolecules which are deemed to be the source of an extraordinary force concentration.

By this conception, because the PTFE molecule is so phenomenally long, it can entwine with a vast number of individual molecules and molecule bundles along its unique length. When one entwined end of such a molecule is moved in a first direction and the other entwined end is moved in a different direction, an extraordinarily large masticating pressure can be exerted at the mid-molecule region even though the molecule itself is quite slippery or lubricious because the force, while generated by the multidirectional movement of masses of polymer, is transmitted and applied as pressure in an ultimate width of only a single molecular chain. The masticating pressure exertable by a single molecule entwined at each end in differentially moving masses of polymer is so extraordinarily high because the area over which the generated force is delivered to an embedded particle is so extraordinarily small.

If the PTFE molecule fiber or bundle of molecule fibers bears against a PVC particle embedded in the polyethylene, the result is similar to placing a fine wire over a block of ice and hanging weights from the two pendant wire ends. The wire will cut through and sever the ice block without melting the whole block and at a temperature below the melting temperature of the ice block.

But, if as a result of shearing which accompanies conventional processing of polymer compositions this procedure is repeated over and over again with smaller and smaller blocks, the PVC particle is in this way masticated and dispersed into the composition by repeated subdivision. It is the inventors' concept that the PVC interaction with the fibers is on a progressively more reduced size scale passing the microscopic and submicroscopic scales and ultimately approaching a molecular scale. With a sufficient degree of shearing, the interdispersion of the polymers is deemed to be accomplished on a scale approaching a molecular scale. In addition, the fibrous masticating agent remains in place after the interdispersion is formed and serves also as an interlocking agent in holding the polymers in the interdispersed form. This fibrous mastication is deemed to occur for the PTFE interdispersing agent as well as for the high molecular weight polyethylene and the ultra high molecular weight polyethylene interdispersing agents.

Accordingly, pursuant to the present invention, it is preferred to accomplish the fibrous mastication of PVC by starting with powdered PVC and incorporating and internalizing the PVC particles in a plastic polymer medium such as polyethylene in which the fibromorphous transition of an interdispersing agent such as the PTFE can proceed as the polymer medium is sheared. Shearing separates the fiber bundles into the phenominally long fibers and imparts the high energy to and along the fibers, which energy is delivered to the enmeshed particles to be masticated.

Accordingly, the PVC is masticated into and interdispersed with the polyethylene at a temperature about one hundred degrees below its conventional working and blending temperature. For this reason, in forming interdispersions, it is preferred to form an interdispersion with finer particles of a higher temperature material such as PVC and to embed such finer particles in a plastic medium such as polyethylene in which the fibrous network, such as the PTFE network, can subdivide and masticate the embedded particles.

This same fibrous mastication of higher melting particles does not occur when the fibers or filaments and ultimately the molecules of a potential fibrous interdispersing agent are shorter because the fiber ends do not entwine as strongly in the oppositely moving masses of polymer in the plastic being subjected to macroshearing.

In the practice of this invention, it is preferable for a higher melting material to be incorporated into a lower melting polymer undergoing shear in the form of powder of such grain size that they can be embedded in the lower melting polymer. In this regard, it is preferred to have higher melting materials in powdered or granular form rather than in pellet form and to add the powder to the lower melting material fluxing in the shearing apparatus.

As indicated above, the action of the fibrous interdispersing and interlocking agent is deemed to be at least part physical and this conclusion is reached in part because the interdispersing and interlocking of diverse sets of polymers occurs with the fine distribution of the fibrous material in the polymers and it does so essentially without regard to the chemical nature, or other affinity factors such as are referred to above, of the polymers which are combined and interdispersed into an intimate interlocked structure. There may also be present some induced intermolecular attractions or forces, either of the distributed fibrous material with the host polymers or between the two or more polymers of the host polymeric interdispersion itself, but the applicants here are not aware of any such phenomena which can be described and, accordingly, offer no explanation or description here.

The applicants are aware that for certain interdispersions which have been studied, there are improvements in the properties which are observed and these are pointed out below in the examples. However, they make no assessment as to the origin of the improvements other than that they are found in compositions in which the finely dispersed fibrous material is also found.

In the examples which follow, a powdery form of PTFE or polytetrafluoroethylene was employed. The powdered PTFE was that available from Du Pont under the trade designation Teflon 6 and is preferred in the practice of the present invention.

It is known that one of the more severe tests of a composition which has been apparently blended, but which may be only partially blended or poorly blended or which may not be a stable and persistant blend, is the test of subjecting the composition to the high levels of shear which are involved in injection molding. If the composition survives without segregation the high shear which is incidental to injection molding, then it is likely also to survive other processing such as milling, extruding, high intensity mixing and the like, which involve lower degrees of shear without segregation of the polymer components and other components of an apparent blend composition.

As described below in Example 1, a composition having an interdispersed set of polymers as a base was prepared first by high intensity mixing in batch form and then by extruding the composition as a wire insulation onto a conductor to form a cable product. The composition was prepared first as a composition containing no crosslinking agent at a higher temperature and then prepared to include the crosslinking agent at a lower temperature as part of the conventional wire insulation forming process of Example 1.

As a separate test of the tendency of the composition of Example 1 to remain interdispersed and to have the normally incompatible ingredients stay together during processing, the interdispersed uncrosslinked composition containing no peroxide crosslinking agent was subjected to an injection molding test to form an injection molded part about three square inches in size. This injection molding was carried out in a Stokes Machine Model 702-1 manufactured by F. J. Stokes Corporation of Philadelphia, Pa. For this particular run made with an interdispersed composition of Example 1 without any peroxide present, the machine barrel temperature was 400° F.; the mold temperature was 150° F.; the mold filling time was 5 seconds and part cooling time before ejection was 50 seconds. It was observed, as pointed out below in Example 1, that the composition did retain its homogeneous composition after injection molding and that the normally incompatible ingredients, namely high density polyethylene and ethylene propylene rubber, did remain intimately interdispersed in the injection molded product and were not segregated or laminated (sometimes referred to as "delaminated") as a result of the injection molding.

The preparation of the composition of Example 1 without a crosslinking agent was carried out with very extensive care to carefully interdisperse the ingredients.

Another injection molding test was done on two interdispersed compositions which were not at all optimized as to the degree of interdispersion before being subjected to the injection molding test.

The first composition was prepared with 20 parts of polystyrene, 80 parts of low density polyethylene and 1.8 parts of fibrous polytetrafluoroethylene. It was milled on a large mill to give a quantity sufficient to form several injection mold samples. The milled composition was removed from the rolls in sheet form and cooled.

When cooled, the composition was fairly smooth-surfaced and was removed from the roll with relative ease and with a minor tendency to stick to the roll. The total milling time was about 20 minutes. No attempt was made to optimize the degree of interdispersion by time, temperature, degree of PTFE dispersion, concentration of PTFE, secondary treatments, additives of any type other than the conventional antioxidant or by any other procedure, manner or means.

The cooled sheet resisted fracture with hand force and a white area developed in an area of the surface before a crack appeared in the area, possibly suggesting fibrous architecture. After the sheeted product was broken with hand force, it exhibited a high degree of fibrous structure at the break. The fracture surface showed laminar or layer-like structure.

The sheeted material was granulated in a conventional granulating machine. The granulated composition was introduced into an injection molding machine and injection molded to form a part corresponding to the injection molded part of Example 1.

The product formed had a smooth shiny surface and conformed well to the shape of the mold.

The product formed broke with roughly the same degree of hand force as the sheet material. The type of lamina found in the broken edge of the sheet material prior to injection molding were also observed in the broken edge of the injection molded material. Both the milled sheet material and the injection molded material were quite tough in their resistance to fracture and in the evidence of fibrous content and character of the material exposed at a broken edge. In fact, the sheet had a tendency to undergo considerable folding before a break occurred.

The evidence that fibers were present was very clear, but is was not determined whether these fibers were solely PTFE or were PTFE associated with the host polymer material. The strong evidence of fibers and the known tendency of PTFE to fillibrate under shear in a polymer medium strongly suggested at least some PTFE fiber presence.

This demonstration is deemed to evidence that polytetrafluoroethylene fibers and fiber bundles can go through the high shear of injection molding. It is also possible that the fillibration of the PTFE is enhanced by the high shear which accompanies the injection molding inasmuch as the fillibration is generally enhanced by shear in the host polymer.

Accordingly, the present invention provides injection molded articles which have fibrous polytetrafluoroethylene distributed therein.

Another interdispersion of low density polyethylene and polystyrene, specifically one prepared in the lower end of the temperature range for forming such interdispersions using 1.8 parts of PTFE, was made to have 20 parts of low density polyethylene in 80 parts of polystyrene. Also, this 20 polyethylene/80 polystyrene interdispersion was repeated using 5 parts of PTFE.

These compositions were also prepared for the first time in larger quantity on a larger plastic mill. They were also taken off the mill in sheet form and showed evidence of lamina at the surfaces formed as the sheet was broken.

The sheets were granulated and each granulated composition introduced into an injection molding apparatus. The injection molded products formed each had a smooth shiny surface closely conforming to the mold shape.

Breaking of the injection molded pieces revealed lamina similar to those of the unmolded sheet material and also strong evidence that the fibrous form of the composition had survived the high shear of the injection molding to form the molded product. The material representing 5 parts PTFE was much more resistant to breakage in both the unmolded mill sheet and the injection molded part.

Where the PTFE is initially well distributed in a wholly homogenized interdispersion such as that produced according to Example 1, the applicants have found that for such a wholly homogenized interdispersion provided pursuant to this invention, the injection molding of a relatively small part of the order of a few square inches in size does not result in such a disruption of the homogeneous interdispersion or segregation of the normally incompatible ingredients of the interdispersion so as to cause observable lamina to form in the injection molded part.

None of the samples involved in these injection molding experiments had been subjected to any secondary processing.

It is contemplated that interdispersion compositions prepared for injection molding should preferably have a degree of dispersion of the fibrous PTFE which is slightly less than optimum so that the additional dispersion of the fibrous PTFE which occurs during the very intense shear of injection molding will bring the dispersion of the fibrous PTFE to an optimum level.

It is known that some natural blends based on natural compatibility and alloying of ingredients do form laminar products when subjected to injection molding in the formation of larger parts of more complex shape. However, it is within the scope of this invention to include small amounts of fibrous PTFE in such naturally compatible compositions to aid and assist in the injection molding of such materials to form larger and more complex parts and to reduce the degree of lamination or delamination which can result from such injection molding of larger parts of complex shape.

It is known that the incorporation of certain flame retardants in polymer materials improves the flame retardance. Materials which need such flame retardant additives are those which are themselves less flame retardant. For example, it is known that polyvinylchloride has a relatively high degree of flame retardance due principally to the presence of the chlorine component of the monomer and of the polymer formed from the monomer. Pursuant to the present invention, it is feasible to disperse a material such as polyvinylchloride into other polymer materials which do not contain PVC. As for example by Example 39, it is demonstrated that an interdispersion of PVC can be made with a polyolefin such as high density polyethylene, and by another Example 33B, 80 parts of linear low density polyethylene were interdispersed with PVC. Also by Example 43E, PVC can be interdispersed with polystyrene to make an easily handleable composition. In general, it is feasilbe pursuant to the present invention to interdisperse chlorine containing polymeric materials such as PVC with other polymers in order to improve flame retardance through such interdispersing.

With further reference to the primary treatment and primary formation of an interdispersion of diverse polymers, it will be understood that unique and valuable properties are imparted to such primary interdispersions and that it is not necessary to apply a secondary treatment or processing, such as crosslinking, to a primary interdispersion, in order to achieve a composition having unique and valuable properties and uses.

In this connection, the above illustration regarding PVC and polyethylene is pertinent. For example, it has been found that a 50/50 mixture of low density polyethylene and PVC (also contained 1.5 parts of Flectol H and 10 parts of dibasic lead phthalate) when formed into a mixture without one of the interdispersing agents of the present invention and than formed into a rod about 40 millimeters long, 1.5 millimeters wide and 1.5 millimeters thick, will, after being ignited, burn continuously in the vertical position with the flame at the upper end.

A second sample of essentially the same dimensions was prepared in essentially the same way with the same ingredients in the same ratios, but with the exception that it contained 1.8 parts of PTFE and constituting an article formed from an interdispersion of the PVC and low density polyethylene. This sample self-extinguished after ignition when held vertically with the burning end up.

As is well known, for example, that thermoplastic low density polyethylene is not flame resistant and that a rod of the polyethylene burns like a candle when ignited and held in a vertical position with the flame up. By contrast, thermoplastic polyvinyl chloride is known to be flame resistant and that it will not support combustion when held in a vertical position with the flame up. In fact, PVC will not burn after application of flame to ignite it when held in a horizontal position or even in an inverted position.

Accordingly, pursuant to this invention and with the aid of the intrdispersing agents of this invention, it is feasible to combine distinct polymer materials into a combined form, herein referred to as an interdispersion, which interdispersion exhibits properties which are not exhibited by the individual polymer ingredients of the combination and also whch are distinct from the properties exhibited by a mixture formed by processing the same polymer ingredients in essentially the same proportions in the same apparatus and under the same conditions.

Many compositions having a polymer base, where the polymer base may be homopolymers, copolymers or combinations of different polymers, including both combinations of homopolymers and combinations of homopolymers with copolymers in different proportions, when heated will progressively soften and as they soften will eventually reach a liquid or liquid-like highly plastic state. One common problem in trying to combine polymeric materials is that the liquid state of one prospective polymer component of the combination is reached at a lower temperature than that of the other component or components. Preferably, materials which can and do combine well together naturally not only have some general molecular structural affinity, but they have a range of plastic properties which extend over a temperature range having some common temperature for the different species. Accordingly, if a material becomes plastic at 100° and a second material also has plastic properties at or near 100°, there is a much better chance of blending them together than if there is one of the materials in a plastic state and the other in an essentially liquid state.

Uniquely, surprisingly and unexpectedly, the compositions of the present invention can be employed to form an interdispersion of polymers which have different ranges of temperatures at which the materials exhibit plastic or plastic-like properties.

According to one concept of the present invention, the range in which the material can be deformed and processed and interdispersed under high shear mechanisms, is due to the presence of an extremely high molecular weight polymer, essentially linear, which in the case of Teflon 6, concomitantly manifests macroscopic and microscopic fibrosity, and which material uniquely disperses in the medium of the plastic host material to exhibit pseudo liquid or pseudo plastic properties and to exhibit these properties through a very broad temperature range up to the temperature at which the unique material itself undergoes decomposition.

It is recognized by the applicants hereof that although the PTFE material which is responsible for the modification of many properties of the polymers to which it is added that the PTFE itself is not subject to thermal fusion and is not subject to thermal bonding. The behavior of the fluorocarbon by itself is well known and has been studied and has been published by the inventors and manufacturers thereof in numerous patents and publications.

However, the properties of the PTFE homopolymer powder by itself are distinct from the properties which this material exhibits when it is finely dispersed and distributed through an interdispersion of host polymer materials, particularly, where the host polymer materials are at elevated temperatures and at temperatures at which one of the polymers might normally be in a liquid state.

One of the key points in the operability of this invention employing PTFE at higher temperatures is the non-fusibility in the plastic polymer media of the fibrous PTFE on which the process apparently depends. This material, that is, the fibrous PTFE, can induce an interdispersed polymer material in which it is dispersed to continue to exhibit a plastic behavior at temperatures at which such plastic behavior might not otherwise be exhibited. POLYMER ADDITIVES There are a number of compositions which are polymer materials, which materials may give beneficial properties to other polymer base materials although present only to a relatively low concentrations as a polymer additive to the base material.

Pursuant to the present invention, concentrates of such polymeric additives are prepared by incorporating relatively high percentages of the PTFE at least partially in fibrous form in the additive to be blended into the base polymer to achieve a relatively low concentration of the additive in the base polymer. By relatively low concentration as used herein is meant a concentration of less than 10%.

Additives may be included in base polymers to possibly improve a number of different properties. For example, a basis host material may be subject to stress cracking and a relatively low level polymer additive may possibly improve the stress cracking of the basis host material. Similarly, improvement in a property such as impact resistance may possibly be achievable by inclusion of a polymer additive.

Alternatively, a base polymer may be subject to degradation due to sunlight and a polymeric additive may possibly impart properties, although present in relatively low percentages, which increase the resistance of the basis host polymer to such light degradation or photodegradation.

Alternatively, a material may be subject to degradation due to oxidative attack. The addition of the stabilizing additive polymer in a small percentage may possibly improve resistance of a basis host polymer to such oxidative attack.

Similarly, resistance of polymer materials to other deficiencies can improve by the addition of certain low concentrations of additive polymer materials, either low molecular weight or high molecular additive materials, to base polymers to overcome the deficiency or defect of the base material.

The use of polymeric materials in low concentrations as additive materials to alter a certain aspect of the properties exhibited by host polymers has been limited heretofore because of the incompatibility of many such potential polymer additives in distinct base polymers.

However, the present invention is deemed to make possible numerous additional combinations of polymeric additives into base polymers as interdispersions of the base and additive polymers to enhance properties of the base polymer.

The present invention has been demonstrated to operate in regard to the interdispersing under a given set of conditions with the aid of an interdispersing agent of an experimental number of sets of polymers which it was found could not be interdispersed under the same set of conditions in the absence of the polytetrafluoroethylene interdispersing and interlocking agent. The PTFE interdispersing of this experimental number of sets of polymers is set forth in the examples below. There is every reason to believe that there are numerous additional multinary sets of polymers which cannot be interdispersed in the absence of the fibrous interdispersing agents of this invention or which can only be partially or poorly interdispersed in the absence of such interdispersing agents but which can be interdispersed by this invention to form interdispersions of distinct polymers of a desired degree of interdispersion or, in other words, a desired degree of intimacy of contact which may approach the molecular level.

Among the polymers which can be interdispersed in each other in multinary combinations and which are deemed to be useful in forming useful insulating compositions are the following:

| | |
|---|---|
| Low density polyethylene | Polyphenylene oxides |
| Linear low density polyethylene | Ethylene ethyl acrylate |
| High density polyethylene | rubbers |
| Low molecular weight polyethylene | Fluorocarbons |
| | Silicone polymers, |
| Ethylene propylene rubbers | including |
| Polyvinyl chloride | silicone gums and silicone |
| Ethylene vinyl acetate copolymers | fluids |
| Styrene butadiene rubber | Polystyrenes |
| Thermoplastic elastomers | Sioplas polymers |
| Chlorinated polyethylene | Natural rubber |
| Polypropylene | Chloroprene |
| Polyetherimide | Polycarbonate |
| Polyesters | Polymethylmethacrylate |
| Polyamides | Polyacetal |

By incompatible polymers as used herein is meant polymers which, under a given set of conditions such as are attainable in conventional polymer processing equipment, do not enter an intimate blend although there may be other conditions usually involving higher energy input at which they may be apparently blended and to some degree which conditions may, for some polymer systems, be attainable in the same conventional polymer processing equipment.

While the invention has been described principally with reference to the improvement in the interdispersing to a desired degree of intimacy of contact of poorly compatible materials and also the interdispersing of incompatible materials or of materials which are incompatible under the set of conditions at which blending is attempted, the teaching of this invention extends to the improvement in the combined properties of materials which are blendable or which are naturally compatible. For example, styrene and polyethylene, when heated to a sufficiently high temperature and mixed together, form what is to the unaided eye an apparent blend of the two materials. For example, as is pointed out in Example 30 below, where 50 parts of polystyrene are milled at 310° F. with 50 parts of low density polyethylene, a composition is formed which has the appearance of a blend.

However, the same two ingredients when milled in the same proportions at about 240° roll temperature, does not blend at all, even apparently, but forms flakes of polyethylene and dispersed particles of polystyrene in the polyethylene. However, the formation of an interdispersion of the same ingredients in the same proportions can be effected by means of the present invention at the much lower temperature of 240°-250° F. and can further be improved by the addition of the fibrous polytetrafluoroethylene interdispersing agent as part of the interdispersing process.

Based on the examples given below, such as Examples 30 and 31, the present invention extends to the improvement in the combining of the materials into an interdispersion and in the interdispersion properties of the combined materials which, under the higher temperature or other special conditions, can be made to enter what appears to be a blended condition by accomplishing the combining at a lower temperature with all of the advantages which attend the lower temperature combination, some of which are known in the art and others of which are pointed out herein.

"PTFE interdispersable" as used herein means that the distribution of fibrous PTFE in a set of polymeric materials permits the binding of the polymers into an intimate interlocked interdispersion and/or the preservation of such interdispersion under conditions under which a blend or apparent blend would not otherwise form or to persist under conditions under which it would not otherwise persist.

In general, the PTFE interdispersing is achieved with a lower level of temperature and other energy input to form the intimate interlocked interdispersion or to preserve the intimate interlocked interdispersion than is otherwise feasible.

With regard to the lower energy of interdispersion formation, an illustrative case is the case of the formation of a binary interdispersion of polyethylene and polystyrene in a 50/50 ratio. An interlocked blend of these two materials can be formed with the aid of fibrous PTFE at a mill roll temperature of 240° F. because the composition is PTFE interdispersable at the 240° F. If the binary LDPE/PS composition is milled at 240° F. without the PTFE, no blend forms between the low density polyethylene and the polystyrene and the milling can be continued for a very extended period without achieving blending as taught in Example 31 below. Also, as an alternative, the 50/50 LDPE/PS composition can be raised to 310° F. and apparently blended on rolls operating at this temperature and, accordingly, at a higher energy consumption as described in Example 30 below. However, the same 50/50 blend of LDPE/PS can be interdispersed with lower energy by milling at about 240° F. and adding a small amount of PTFE as taught in Example 31 below.

In the above described examples, the difference in milling temperatures and the ability to form an intimate interlocked interdispersion at the lower temperature can be significant not only because the polymer system has "seen" or been through an overall lower temperature profile since the inception of the polymer ingredients of the interdispersion, but also because it makes possible a different array of secondary processing steps.

For example, a reasonably priced and very widely used peroxide crosslinking agent is dicumyl peroxide. This material is used extensively and its use is described illustratively in the examples below. Its commercial identity and source are set forth as in Example 1.

The dicumyl peroxide crosslinking agent can be milled into a composition undergoing milling at 240° F. without initiating thermal decomposition of the peroxide. If a small amount of dicumyl peroxide as, for example, 0.1 parts, is milled into a composition which is milled to intimate interlocked interdispersion with the aid of the fibrous PTFE, then the composition will become essentially homogeneous with regard to the distribution of PTFE, the two polymer ingredients of the interdispersion, and the peroxide crosslinking agent before any decomposition of the peroxide agent and before any crosslinking occurs.

By gradually raising the temperature of the composition while it is undergoing milling or high intensity mixing, a partial peroxide crosslinking can be induced between the polymeric constituents of the interdispersion while they are in the intimately admixed status of the interdispersion. Such a lower temperature interdispersing of all constituents and partial peroxide crosslinking of some of the interdispersed polymers is not feasible for an apparent blend formed according to Example 30 because the temperature of blending of 310° F. necessary to form the blend is above the decomposition temperature of the peroxide crosslinking agent and the peroxide as well as the polymer may accordingly not become uniformly distributed before decomposition occurs. Accordingly, where a thermally decomposable secondary processing agent such as dicumyl peroxide is added to a composition to be blended at a temperature above that at which decomposition occurs, the polymer ingredients do not have a chance to combine to best advantage before the thermal decomposition and secondary process is initiated. In other words, the secondary processing occurs in such case before the primary processing is complete or brought to a desired stage of completion.

This is another indication of the advantage of the invention which relates to the lower energy level at which polymers can be interdispersed with the aid of fibrous PTFE pursuant to this invention and of the opportunity made possible by such lower energy interdispersing of imparting secondary processing treatment steps to the interdispersed composition because of the lower energy interdispersing made possible by the present invention.

Another illustration of this phenomena is the addition of benzoyl peroxide to a low density polyethylene-containing interdispersion at about 170° F. This temperature is well below the conventional processing temperature for low density polyethylene-containing mixtures.

In preparing the interdispersed compositions of the present invention, it is sometimes advantageous to have the PTFE well dispersed in a first polymer before the second polymer is added. The level of concentration at which the PTFE affects the properties of the first polymer and permits the interdispersion of a second distinct polymer is quite low.

With less than one-tenth of a part addition, there is a very noticeable change in the extensability or stretchability in low density polyethylene material, in the strength of the material, and in the reduction of the degree of adherence to the mill so that it releases easier from the mill. It is believed that effective interdispersing of a small amount of a second and distinct polymer will occur at and below this level of concentration of PTFE. From the changes which occurred it appears to us that it may be possible to add as little as perhaps 5/100 of one part to cause a substantial change in the properties exhibited by a homopolymer, such as polyethylene, and which will permit the interdispersion of small amounts of a second polymer into the first polymer bearing the PTFE as, for example, into low density polyethylene. Accordingly, it appears that the interdispersion effects at low level of second polymers obtainable through the present invention may be obtainable at levels of powdered PTFE or the order of 5/100 of one part. The phenomena may occur perhaps as low as 1/1000 of a part. The use of such low levels of PTFE in forming partial interdispersions of compatible polymers and to improve interdispersion as well as properties of poorly compatible as well as of in compatible polymers is contemplated as within the scope of the present invention.

MOLECULAR WEIGHTS

The present invention is adapted to the multinary interdispersing of distinct polymers with the aid of fibrous PTFE. The polymers may be organic or inorganic and the interdispersions formed may be interdispersions of organic polymers with other organic polymers, they may be inorganic polymers with other inorganic polymers, or they may be interdispersions of organic polymers with inorganic polymers.

From the great diversity of polymers which have been interdispersed with the aid of fibrous PTFE, it is evident that a wide variety of polymeric materials are interdispersable with the aid of the fibrous PTFE or its equivalent fibrous agent, such as ultrahigh density polyethylene, as discussed above.

The term polymer connotes generally, and by conventional usage, a relatively larger molecule polymer as distinct from dienes, trimers and the other relatively lower level polymer molecules.

Technically, a polymer may include simply a dimer, that is, a polymer such as polyethylene in which the structural formula may be represented as follows:

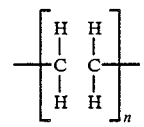

in which the "n" is 2.

Allowing for end capping, an ethylene dimer is a very small molecule and is simply butane, or structurally, it is:

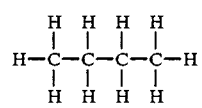

Polyethylene in which "n" is 3 is a trimer of ethylene is also a very small molecule and is simply hexane, or structurally, it

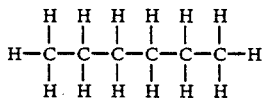

The scope of the present invention does not extend to the interdispersing of dimers or trimers and other very small molecules with each other.

However, it does extend to the interdispersing of one polymer into another where one polymer is a relatively low molecular weight polymer and the polymer into which it is blended is a higher molecular weight polymer. For example, low molecular weight silicone fluid has been blended into low density polyethylene.

This low molecular weight silicone fluid having a viscosity of 30,000 centistokes was incorporated successfully into the low density polyethylene with the aid of fibrous PTFE although an attempt to incorporate the same material into low density polyethylene by fluxing on a polymer mill under the same conditions was entirely unsuccessful when the fibrous PTFE was omitted.

The incorporation of low molecular weight polymer in higher molecular weight polymer with the aid of fibrous PTFE is within the scope of the present invention.

Further, it was possible experimentally to at least tentatively incorporate about three parts of a liquid silicone having a viscosity of 10 centistokes in low molecular weight polyethylene by the use of the fibrous PTFE although the liquid could not be incorporated in the low density polyethylene at all without the aid of the fibrous PTFE.

This processing of low molecular weight polymer is discussed in Example 36 below.

As a lower limit, the molecular weight of polymers which are beneficially interdispersable and otherwise processable with the aid of fibrous interdispersing agents of this invention is deemed by the applicants herein to be of the order of 600 to 1000.

As used herein, the term copolymer includes terpolymers and other polymers made with more than two monomers.

The term ethylene propylene copolymer or ethylene propylene rubber is intended to include the copolymer made with only ethylene and propylene monomers, as well as copolymers made with ethylene, propylene and diene monomers.

CONCENTRATES

The concentrates are compositions in which the percentage of fibrous polytetrafluoroethylene dispersed in a polymeric medium is relatively high.

The concentrates are not materials which are necessarily intended for end use application themselves, but rather may be compositions which contain higher levels of the fibrous PTFE and which permit the dispersion of the PTFE in fibrous form into polymeric medium with relative ease of processing.

For example, it has been found possible by milling on a small rubber mill as described in the examples below, to introduce approximately 6 parts of the fibrous PTFE into natural rubber before the composition becomes poorly millable.

It was also found experimentally that it was possible to introduce approximately 12 parts of the fibrous PTFE into high density polyethylene on the mill before the composition became poorly millable.

However, it was found that when the fibrous PTFE was introduced into a 50:50 interdispersion of high density polyethylene and natural rubber, that approximately 25 parts of the fibrous PTFE could be incorporated into the interdispersion before the composition became poorly millable to a degree similar to the degree reached with the natural rubber alone and with the high density polyethylene alone.

Accordingly, pursuant to the present invention, concentrates of PTFE in various polymer media can be prepared and the concentration of the PTFE in the polymer media will depend on the concentration of PTFE which is needed for a particular application and also on the different levels and degrees of the dispersability of the PTFE in the polymeric materials.

THERMAL HISTORY

It is well accepted in the plastics industry that there is an advantage in the processing of polymeric materials through a thermal history which may be referred to for convenience of reference as one having a "low profile". What is meant is that if the polymer from the time of its inception in the polymeric state is exposed to and subjected to a thermal history, which is of a low profile type rather than a high profile type (i.e., with temperature plotted as ordinate and time as abscissa), that the polymer will have a better chance of retaining its properties and a better chance of avoiding the initiation of the degradative processes to which essentially all polymeric materials are subject. In general terms, the performance of a polymeric product may be inferred to be reciprocally related to the cumulative excessive thermal history that the material has experienced.

Contrasted with this preferable low profile history is the recognition that if a polymeric material is taken to a sufficiently high temperature, it may be made to undergo unique transformations or reactions. For numerous polymer systems, one such unique transformation is an intermingling and blending of two or more polymers of such a system which can not be achieved at lower temperatures.

Accordingly, it is possible in varying degrees for different polymeric materials to accomplish an apparent blending of the materials if the materials are taken to a sufficiently high temperature and subjected to a sufficiently high level of intermixing or shearing. Such apparent blends may be persistant when cooled or they may segregate. They also may delaminate when injection molded. There are not many such apparent blends which have achieved appreciable commercial or industrial use.

One element of blending is a high degree of intermingling. This can be accomplished in part by increased mechanical agitation and in part by increased thermal exposure to two candidate polymer materials of a system as they are subjected to intense agitation and mixing. The polymers of such system may be closely intermingled because the increased temperature increases the tendency of the materials to intermingle on a molecular basis.

Accordingly, considering the subject application and the invention in the context of the ability to subject materials to extremes of temperature and agitation, it will be recognized that one of the principle advantages of the present invention is the achievement of the interdispersing at what is deemed to be essentially the molecular level without subjecting the materials to such extremes of temperature or agitation or intermixing.

Accordingly, one advantage made possible by the present invention is the reduction in the overall thermal history of materials which are intimately interdispersed. As used herein, the term thermal history is intended to include the temperature to which a polymer material is raised; the cumulative times which it is at such raised temperatures; the other energy which is put into such material; the level or degree of other energy inputs are made; and the cumulative time during which such inputs ar such levels are made.

Although in this context of using extremes of temperature and agitation numerous polymer materials can apparently be blended with other polymer materials, to the Applicants' knowledge no effort has been made to develop and use significant numbers of such apparent blends commercially. This appears to be principally because the properties of the materials are found to be inferior in some respects.

For example, the apparent blend produced according to Example 4 was found to be deficient in tensile properties and in the roughness of its surface properties for the intended use as a cable insulation material.

As another illustration, in Example 24 below, a composition 24A containing an apparent blend of linear low density polyethylene and EPDM was made under a given set of processing conditions without any Teflon 6. Its tensile and elongation properties were tested.

Teflon 6 was then added to the same composition under the same given set of processing conditions to form an interdispersion sample 24B and its tensile and elongation properties were also measured.

The test results are as follows:

|  | SAMPLE 24A | SAMPLE 24B |
| --- | --- | --- |
| Tensile in psi | 1453 | 2483 |
| Elongation in % | 426 | 550 |

The significantly lower tensile and elongation values obtained for sample 24A as compared to sample 24B are deemed to evidence that these properties of apparent blend are deficient relative to the PTFE containing blend.

Applicants believe that, in general, the properties of apparent blends prepared under the same processing and treatment conditions as interdispersions prepared with the aid of the interdispersing agents of this invention are deficient in some properties.

As used herein, the term "systems" connotes a combination of a first polymer with at least a second polymer in which the proportions of the first and second polymers are varied over a wide range, and in which different sets of properties are evinced by the combination of copolymers in the different proportions including different proportions of the polytetrafluoroethylene interdispersing agent of this invention.

By "physical interdispersing" is meant herein, interdispersing with the aid of inducing motion in the composition as by stirring or other agitation and, particularly, the agitation which induces a high level of shear in the composition and can include heating by whatever means including imparting heat to the composition by the agitation itself as, for example, by a work heat or the like. But such physical interdispersing does not include chemical interaction, such as are necessary to form chemically linked polymers in the form of copolymers.

One of the characteristics of the combination of fluorocarbons with the polymer base medium which is significant in achieving the results of the present invention, is the ability of the fluorocarbon to form into fibers which become associated with the host polymer and become distributed in the polymer. It is not understood why the fluorocarbon develops the fibrous form which it does, nor is it understood why the host polymer associates with these fibers and undergoes a significant change in its properties, but it is found that when the fluorocarbon does form the elongated fibers or filaments and does become distributed in the host polymer and associate with the polymer, that significant changes occur which permit the interdispersing of polymeric materials which are not otherwise blendable by the same physical and thermal means and methods. Similar modification of host polymer properties and manifestations are attainable by the distribution of ultrahigh molecular weight polyethylene and of high molecular weight polyethylene in a polymer or a polymer system.

By "high shear" as used herein, is meant a degree of shear which is sufficient to cause a filamentary dispersion of polytetrafluoroethylene to form from a powder form of the polytetrafluoroethylene present in the material being subjected to the shear.

By "filamentary form" as used herein is meant that the polytetrafluroethylene is strung out into very fine diameter and long strands or fibers in which the length to diameter ratio is high as it is for most fibrous strands or filamentary materials.

As used herein, the term "incompatible" means that the polymer species do not blend in one another in significant proportions although there may be some low level of tolerance of one material in the other which may be in the order of a fraction of a percent, a few percent, or up to about 10 percent. For example, 2,6-poly dimethylphenylene oxide is not compatible with low density polyethylene although the polyphenylene oxide does accept a small amount of polyethylene as described in the U.S. Pat. No. 3,361,851. Where the polyethylene is present, it is described in that patent as a plasticizer for the polyphenylene oxide.

Generally speaking, the plastic stage as used herein means that the material is not liquid and is not readily flowable and does not easily and quickly take the form of a vessel in which it is contained, and also means that it is subject to being extensively formed or deformed without breakage. For example, if a plastic material at its plastic stage is in a mechanical agitator and force is applied to the plastic material, it will deform and repeatedly deform and will be sheared in the process of being deformed, but will not rip or tear or break in this process. This plastic stage is the stage in which most blending of ingredients into a polymer material or most interdispersing of polymer materials into each other is carried out. Interdispersing of a liquid phase polymer into a plastic material is feasible pursuant to the present invention as is pointed out above.

"Creep" is defined as non-recoverable deformation, with time, under a constant load.

According to the Van Nostrand Reinhold Condensed Chemical Dictionary, the term "engineering plastics" are types to which metal engineering equations can be applied and are plastics that are hard and stable enough to be treated as a metal. Such materials are capable of sustaining high loads and stresses and are machinable and dimensionally stable. They are used in construction, as machine parts, automobile components, telephone headsets, and numerous other items. Among the more important are nylon, acetals, polycarbonates and ABS resins, PPO/styrene and polybutadiene terephthalate.

Pursuant to the present invention, interdispersions of engineering plastics can be and have been made. For example, nylon has been successfully interdispersed with polystyrene and acetal resin has been successfully interdispersed with polystyrene as pointed out in the examples below. The interdispersing of engineering plastics with non-engineering plastics and the interdispersing of engineering plastics with each other is contemplated as within the scope of the present invention.

EXAMPLE 1

A novel cable insulation composition was prepared and a cable and an injection molded part were prepared according to the following example.

In all of the examples below, the term "parts" is used to designate a quantity of an ingredient by weight based on the weight of the polymer base ingredient of the composition taken as 100. As an example, if the composition contains 500 grams of base polymer and 50 grams of an additive, the content of the composition is stated as 100 parts of polymer and 50 parts of additive.

Where the polymer base itself contains more than one polymer, the parts of each polymer ingredient of the base is recited in parts in the proportions they are present in a composition. For example, in this Example, high density polyethylene is present to a 20% percentage level and ethylene propylene diene monomer, EPDM, is present at an 80% percentage level. This is recited as 20 parts of high density polyethylene and 80 parts of EPDM. Accordingly, in the above illustration, if the 500 grams of polymer were 100 grams of high density polyethylene and 400 grams of EPDM, the composition would have a polymer base of 20 parts HDPE and 80 parts EPDM. If the additive were 500 grams of clay particles, the additive would be reported in the examples below as 5 parts of clay particles.

Also, if the composition were made up of 400 pounds of EPDM, 100 pounds of HDPE and 50 pounds of clay particles, it would be reported as 20 parts of HDPE, 80 parts of EPDM and 5 parts of clay particles.

Accordingly, all quantities of ingredients recited in the examples below in parts may be readily converted to grams or other weight units. In fact, most examples were made on a small laboratory plastic mill and the parts were directly determined from an equivalent number of grams actually weighed out.

A set of ingredients and proportions of the ingredients are thoroughly mixed in a high intensity mixing apparatus, such as a Banbury mixer.

The ingredients are introduced into the high intensity mixer which is in motion and which has an initial temperature of about 150° F. The mixing action of the high intensity mixer generates heat in the composition and the composition temperature is measured during the mixing by a thermocouple sensor which is built into the high intensity mixer so that a record of the temperature of the sensor can be observed and recorded as on a chart.

When the chart temperature of the composition reaches about 320° F., the composition is dropped from the high intensity mixer through a mechanism built into and normally used for this purpose. The heat which the composition has received during this temperature rise is a heat of mixing and no high temperature external heat need be applied in order to attain this temperature increase.

The dropped batch of material, which has a probe temperature (measured by an inserted thermocouple) of about 340°-360° F., is then milled on a plastic mill after removal from the high intensity mixer. The material on the plastic mill is banded on the mill and then taken off as sheets. The sheet product is allowed to cool to lower its general temperature and also the high intensity mixing apparatus is allowed to cool. The sheet material is reintroduced into the high intensity mixer when the mixer temperature is about 150° F. in der that a peroxide crosslinking agent may be dispersed into the composition of the sheet material at a temperature lower than the drop temperature of the previously interdispersed material as removed from the high intensity mixer. The dispersing of the crosslinking agent, specifically, a peroxide, is at a lower temperature, below the decomposition temperature of the peroxide crosslinking agent in order to forestall premature crosslinking of the interdispersion of ingredients. The composition with all of the ingredients is mixed in the high intensity mixer at a temperature of approximately 250°-270° F. maximum until an apparently homogeneous composition is formed.

One unique property of the interdispersed composition, as it is dropped from the high intensity mixer, is its very homogeneous, smooth surface. The composition is observed to have no apparent inclusions of non-homogeneous structure and, in this sense, the composition is quite novel and unique, particularly inasmuch as there is no compatibility normally of the high density, highly crystalline polyethylene and the semi-crystalline ethylene-propylene rubber. Quite unexpectedly and surprisingly, it has been discovered that it is possible to interdisperse together into a homogeneous interdispersion the two incompatible base polymers, namely high density polyethylene and semi-crystalline ethylene-propylene copolymer, and to do so without any evidence of segregation, delamination, or insufficient mixing, nor of the basic incompatibilities of the base polymer materials, namely high density polyethylene and semi-crystalline ethylene-propylene rubber. It has been known for many years that by their nature, these materials are incompatible and cannot be mixed to form a homogeneous blend. It has accordingly been discovered that the fibrous fluorocarbon component of the composition is responsible for making it possible to interdisperse the otherwise unblendable high density polyethylene and the ethylene-propylene rubber.

Following the introduction of the peroxide crosslinking agent into the previously interdispersed compound, it is again rolled on a plastic mill into sheet form from which it can be cut into strips for pelletizing for later use in an extruder. The composition prepared as described above was formed into strips and these strips were cut into pellets in a conventional pelletizing apparatus.

The pelleted material was later introduced into an extruder having a 3½ inch screw with a 15:1 length to diameter ratio. The compression ratio based on the screw design of the extruder was three to one.

The pelleted material of this example was introduced into the extruder and the composition was extruded onto a conductor. The composition was extruded onto a #12 AWG 19-strand conductor to form an insulating layer having approximately a 0.030 inch wall thickness. The test specimen identification was ID-92-99-3.

Test data was obtained on the sample by conducting a number of tests. The tests were standard tests employed in the industry in this technology. A tensile test which was done on the insulation at 20 inches per minute according to standard industry practice gave an original tensile value of 2488 pounds per square inch. The elongation test performed on the same sample at the 20 inch per minute testing rate gave an elongation value of 414%.

The hot modulus of the material was measured according to established industry practice by which the testing sample is subjected to a hot environment of 150° C. for 5 minutes. Then, the force required to stretch the test sample to 100% elongation is measured and the force is computed in psi units as a measure of tensile strength. The hot modulus value found for this product of Example 1 was 250 psi.

This value of hot modulus is quite surprising, unique and unexpected. To illustrate the novelty of this result, if the hot modulus of a composition containing essentially the same ingredients as that of Example 1 but excluding the PTFE were measured, but the base polymer were entirely the ethylene-propylene rubber, it is estimated that the hot modulus obtained would be approximately 100 psi. Also, if a sample having essentially the same additives as those used in Example 1, but having solely high density polyethlyene as the base polymer and having no PTFE were prepared and tested and the hot modulus measured, it is estimated that the hot modulus of such a material would be approximately 100 psi. This value is estimated because it has not been possible heretofore to produce a wire insulated with chemically crosslinked high density polyethylene without the aid of PTFE. Accordingly, it is very unique and distinctive and surprising to find, when the two materials are used in combination with a minor amount of polytetrafluoroethylene, that a hot modulus of 250 psi is found. It is believed that the distinctive hot modulus value is due in part to the fact that the unique interdispersing of the high density polyethylene and the ethylene-propylene rubber can be and is accomplished as a novel composition of this invention, but in addition, that there is an influence on the hot modulus which is the result of the presence of the novel and unique interdispersing agent which is employed and, specifically, the polytetrafluoroethylene.

Another measurement made on the insulation layer formed on the wire of this example is the heat distortion at 150° C. The heat distortion is a measurement of the distortion of the insulation on the wire when a 500 gram weight is rested on the wire so that an area of the weight according to the established industry standard is bearing on the insulation. This heat distortion test is measured in terms of the percent change in the diameter of the wire with the 500 gram weight bearing on the wire. It was observed for the insulated wire as prepared in Example 1 that the heat distortion was 1.64%, or, the insulation deformed to the extent of 1.64% of the original dimension of the insulated wire. In other words, the wire with the 500 gram weight on it retained 98.36% of its original diameter. Again, it is a reflection of a very unique and novel combination of properties to be found in a single cable insulation to have the high values of tensile and elongation as are found for the cable of Example 1, and at the same time, to have such a low value of heat distortion at the elevated temperature of 150° C. at which the heat distortion measurement is carried out and made. As an illustration of the significance of this relatively small value of 1.64% distortion at 150° C., it is a fact that the industry standard for an insulated wire of the construction of that provided by Example 1 is a full 20% and, accordingly, a value as provided here of only 1.64% is unusually excellent for a wire construction.

Additional tests were conducted concerning the suitability of the wire insulation formed in accordance with the present invention using standard industry tests and it was found that the composition served satisfactorily as a wire insulation.

TABLE I

| COMPOSITION | PARTS |
|---|---|
| High Density Polyethylene, Density = 0.950; Melt Index = 8; Sold by USI Chemical Co. under the trade designation LS506 or MA 778 | 20 |
| Semi Crystalline Ethylene Propylene Copolymer, Sold by DuPont under the trade designation Nordel 2722 | 80 |
| Polytetrafluoroethylene powder supplied by Du Pont under the trade designation Teflon 6 | 1.8 |
| Crosslinking Agent (2,5 dimethyl-2,4 di[tert-butyl peroxy]hexyne-3) supplied by Penwalt Co. under the trade designation Lupersol 130 | 3 |

Nordel is a trademark of the Du Pont Chemical Company. It is applied to elastomers based on an ethylene-propylene-hexadiene terpolymer.

A composition containing the same ingredients as set out in Table I above, but excluding the peroxide component, was prepared for injection molding by the compounding procedure using the high intensity mixer as described above. The composition was first mixed in a high intensity mixer followed by banding on a mill roll. The material was taken off the mill as strip and diced in a conventional dicing maching. The diced material was fed to an injection molding machine and injection molded as described above to form an injection molded part of about three square inches area and one-eighth inch thickness.

The product formed was highly pliable and had substantial integrity.

EXAMPLE 2

The composition as described in Example 1 was prepared but the PTFE was omitted. The composition was placed in a high intensity mixer, specifically a Banbury mixer, and an effort was made to blend the ingredients as listed in Example 1 with the exception of the PTFE ingredient.

After an extended period of mixing at essentially the same temperature conditions and time as described in Example 1, the material was dropped from the Banbury in bulk form and appeared in bulk to be adequately mixed. After the first Banbury mixing, the composition was put on the mill in order to form sheet of the product and it was there observed that the material was obviously not homogeneously mixed as evident from the roughness of the texture of the material and the surface dryness of the material and also the asperities observed in the material. Nevertheless, the material was formed into a sheet and the sheet was taken off the mill having a rough texture, very different from that observed in the similar step of Example 1. The sheeted material was then placed back in the Banbury mixer at a lower temperature and the peroxide additive as well as the silicone fluid additive were included in the high intensity mixer for blending into the composition. After further high intensity mixing at the lower temperature, the composition was dropped from the Banbury and again appeared in bulk to have the ingredients mixed together satisfactorily.

The dropped composition was placed on a mill and milled to sheet form. The sheet material on the mill again appeared to have quite a rough texture and a dry surface and was far inferior in its appearance to the composition at the same stage as recited in Example 1.

The composition was taken off the mill as strip and the strip was diced in a conventional dicing apparatus. The diced composition was introduced into an extruder and the composition was extruded onto wire to form an insulation.

It was observed that the insulation layer formed by the extruder was quite uneven and lumpy and had an irregular surface which made it quite unsatisfactory for use as a cable insulation layer. The tensile strength of the layer of material was tested after a sample was removed from the wire surface. The tensile measurement indicated that the tensile strength was less than 1200 psi and, accordingly, only about one-half of what was required in the way of tensile strength for a cable to be applied to the uses for which this cable was intended.

The very poor results obtained in the tensile test and the very poor appearance and the surface roughness, lumpiness and unevenness of the cable insulation indicated that it was not worth running further tests on this cable insulation based on prior experience in dealing with the insulations of many different cables.

EXAMPLE 3A

A set of ingredients, given in proportions of parts by weight, are set forth in Table II.

The ingredients, other than the peroxide, are introduced into a high intensity mixer which has been preheated to a temperature of 150° F. and are mixed in the apparatus for a period of time sufficient to achieve a good blend and to raise the temperature of the blend due to the imparting of a heat of mixing to the composition as the high intensity mixer operates. When the chart temperature of the composition reaches about 320° F., the composition is dropped from the high intensity mixer through a mechanism built into and normally used for this purpose. The heat which the composition has received during this temperature rise is the heat of mixing as in Example 1, and no high temperature external heat need be applied in order to attain this temperature increase.

The dropped batch of material which has a probe temperature measured by an inserted thermocouple of about 340°-360° F., is then milled on a plastic mill after removal from the high intensity mixer. The material on the plastic mill is banded and taken off as sheets. The sheet product is allowed to cool and the blending apparatus is also allowed to cool. The sheet material is reintroduced into the high intensity mixing apparatus when the apparatus has a temperature of about 150° F., and a composition containing 3 parts per hundred of dicumyl peroxide is added to the composition in the mixer. The contents of the high intensity mixer are mixed and the composition temperature rises due to the heat of mixing which is imparted thereto. The peroxide containing composition ingredients are mixed into the composition and the temperature is allowed to rise to approximately 240° F., but not to higher temperatures in order to avoid premature decomposition of the dicumyl peroxide. The composition is mixed in the high intensity mixer to form an interdispersion of the low density polyethylene and the ethylene propylene diene monomer, EPDM.

Accordingly, this example provides another demonstration of the unique capability of the interdispersing process of this invention to bring together what are otherwise and what are normally incompatible polymer materials in proportions which are incompatible, to yield interdispersions and to generate unique materials which have a high degree of homogeniety.

Following the introduction of the peroxide containing material and the removal of the compound from the high intensity mixer, it is again rolled on a plastic mill into sheet form and cut into strips for pelletizing for later use in an extruder. The pelletized material which was prepared from the composition of this example was later introduced into the extruder which was described and used in Example 1 above. The pelleted material was run through the extruder and extruded onto a #12 AWG conductor formed of 19 strands. The insulation layer deposited on this conductor had a thickness of approximately 0.030 inches. The test specification identification number was ID-92-89-6.

Tests were run on the wire thus prepared and test data was obtained and the test results are set forth in the accompanying Table II.

EXAMPLE 3B

The composition prepared as described in Example 3A was employed to extrude an insulation layer on a #12 AWG stranded conductor having 19 single strands. The thickness of the insulation layer was 45 mils, or 0.045 inches. The insulation thus formed was tested and the tensile and elongation values obtained were 1873 pounds per square inch and 294 percent, respectively. The sample was tested for crush and abrasion resistance and values of crush of 3460 pounds and abrasion resistance of 1171 cycles were found.

EXAMPLE 3C

The composition prepared as described in Example 3A was also used to extrude an insulation coating of 0.075 inches onto a conductor designated as an MCM 313 conductor. An insulation layer of 0.075 inches was deposited on the conductor. This layer successfully insulated the conductor.

EXAMPLE 3D

The composition prepared as described in Example 3A was extruded onto a conductor of 646 MCM. The insulation layer deposited was 0.090 mil. A successful insulation of the larger conductor was accomplished.

As used herein, a circular mil is a unit of measurement for the thickness of wires. It is equal to an area of a circle with a diameter of 1 mil. A wire or conductor can be described in terms of the number of circular mils which it contains. The designation "MCM" as used herein means thousand circular mils. In other words, it is a measure of a conductor having a cross-sectional area of one thousand circular mils as the definition of circular mil is given above.

If a conductor is 313 MCM, that means that it has 313,000 circular mils in its cross-section. A conductor with 646 MCM has 646,000 circular mils in its cross-section. This is the cross-sectional area of actual conductor and does not encompass the overall outer dimensions of the conductor nor the space between individual strands of the conductor, but rather is a measure of the total cross-section of conductor in the cable independently of the stranding or strand size or conductor size of the cable.

TABLE II

| COMPOSITION | PARTS PER HUNDRED |
| --- | --- |
| Low Density Polyethylene, Density = 0.920; Melt Index = 2.5; Sold by City Service Company under the trade designation EH497 | 30 |
| Semi Crystalline Ethylene Propylene Copolymer, Sold by DuPont under the trade designation Nordel 2722 | 70 |
| Polytetrafluoroethylene powder supplied by Du Pont under the trade designation Teflon 6 | 1.5 |
| Dicumyl peroxide curing agent available commercially from the Hercules Company under the trade designation DiCup R | 3 |
| Miscellaneous additives | 132.5 |

EXAMPLE 4

The composition as described in Example 3A was prepared but the PTFE was omitted. The composition was placed in a high intensity mixer, specifically a Banbury mixer, and an effort was made to blend the ingredients as listed in Example 3A with the exception of the PTFE ingredient.

After an extended period of mixing at essentially the same temperature conditions and time as described in Example 3A, the material was dropped from the Banbury and appeared in bulk to be adequately mixed. After the first Banbury mixing, the composition was put on the mill in order to form sheet of the product and it was there observed that the material was obviously not well or homogeneously mixed as evident from the roughness of the texture of the material and also the asperities observed in the material.

Nevertheless, the material was formed into a sheet and the sheet was taken off the mill having a rough texture, very different from that observed in the similar step of Example 3A. The sheeted material was then placed back in the Banbury mixer at a lower temperature and the peroxide additive material was included in the high intensity mixer for blending into the composition. After further high intensity mixing at the lower temperature, the composition was dropped from the Banbury and again appeared in bulk to have the ingredients mixed together satisfactorily.

The dropped composition was placed on a mill and milled to strip form. The material on the mill again appeared to have quite a rough texture and a dry surface and was far inferior in its appearance to the composition at the same stage as recited in Example 3A.

The composition was taken off the mill as strip and the strip was diced in a conventional dicing apparatus. The diced composition was introduced into an extruder and the composition was extruded onto wire to form an insulation.

It was observed that the insulation layer formed by the extruder was quite uneven and lumpy and had an irregular surface which made it quite unsatisfactory for use as a cable insulation layer. The tensile strength of the layer of material was tested after a sample was removed from the wire surface. The tensile measurement indicated that the tensile strength was less than 800 psi and, accordingly, only about one-third of what was required in the way of tensile strength for a cable to be applied to the uses for which this cable was intended.

The very poor results obtained in the tensile test and the very poor appearance and the surface roughness, lumpiness and unevenness of the cable insulation indicated that it was not worth running further tests on this cable insulation based on prior experience in dealing with the insulations of many different cables.

EXAMPLE 5A

EPR/LDPE; EPR/HDPE; 90/10

The ingredients other than the peroxide containing material were introduced into a high intensity mixer preheated to a temperature of about 150° C. essentially as described in Example 3. No PTFE was included in this specific composition. After thorough mixing, the composition was dropped from the mixer at a temperature of about 290° F. The composition was observed to be relatively coarse and rough in its surface characteristics, indicating that the complete and intimate intermixing of the ingredients, which had apparently occurred in Example 3, had not occurred in the material of this Example 5A. There was, however, a low degree of apparent blending, evidently due to the fact that the percentage of the low density polyethylene was relatively low in this composition and that the EPDM, i.e., the Nordel 2722 ingredient, has an ability to accept and blend with a relatively small amount of the low density polyethylene without the aid of any agent. The presence of the fillers and additives in the composition apparently does aid in establishing an apparent blend. In the absence of these fillers and additives, the degree of blending is not nearly as high and a certain amount of delamination or separation of the polymer components is expected for the unfilled composition.

The dropped compound was put on a mill and taken off in sheet form for later reintroduction into the high intensity mixer. The high intensity mixer was allowed to cool to about 150° F. and the sheets of compound were introduced into the mixer together with peroxide as shown in the Table III.

The composition formed from this high intensity mixing had a final temperature of below approximately 240° F. to avoid the premature decomposition of the peroxide. The composition was placed on a mill and taken off in sheets and the sheets were processed through a conventional dicing machine to form pellets of the peroxide containing compound.

The compound pellets were introduced into an extruder and the compound was extruded onto a #12 AWG 19-strand conductor to form an insulating wall on the conductor having dimensions of approximately 0.030 inches. This wire and its insulation were immediately passed into a conventional high temperature, high pressure curing chamber and were exposed to the saturated steam of the chamber for a time sufficient to cause decomposition of the peroxide and the crosslinking of the polymer components of the composition. The crosslinked wire product was removed from the chamber through a water seal in the conventional manner.

EXAMPLE 5B

The procedure as carried out above was repeated for sample 5B with the exception that although all of the other ingredients and ingredient concentrations were essentially the same as used in Example 5A, 1.5 parts of Teflon-6 were added to the composition to form composition 5B. The blending procedure was carried out as described with reference to Example 5A and it was observed that a very smooth, creamy, apparently homogeneous interdispersion of ingredients was formed from the initial mixing and was further formed from the additional mixing with the peroxide containing ingredient.

There was a very noticeable difference in the appearance of the composition prepared by this Example 5B, particularly in the surface appearance of the compound as the compound was much more uniform and smooth in its surface appearance, and in its internal appearance when subjected to a cutting than the composition of Example 5A. The smoother surface appearance and smoother working of the compound was also observable on the mill as the compound was being sheeted preparatory to dicing.

Following the preparation of the composition, it was extruded on a wire as described in Example 5A, and tests were conducted on the wire insulation. The abrasion test resulted in a finding of a value of 399 cycles as compared to the 235 cycles found for Example 5A. This resulted in an increase of approximately 70% in the abrasion resistance of the wire. This increase in the abrasion resistance was attributed to the addition of 1.5 parts of the Teflon 6 and to the increased homogeneity of the composition which resulted from the addition of the 1.5 parts of the Teflon 6.

EXAMPLE 5C

The procedures recited with regard to Examples 5A and 5B were repeated but, in this case, with the addition of 3 parts of Teflon 6 to the composition as compared to the 1.5 parts in Example 5B and 0 parts in Example 5A. Again, a much more homogeneous and smooth surface composition was found in Example 5C as compared to that from Example 5A. The composition was extruded onto a wire to form a 0.030 inch wall thickness.

An abrasion resistance value of 577 was found on testing and represents an increase over that found for Sample 5B of about 45% and represents an increase in abrasion resistance over Sample 5A of approximately 145%. Accordingly, this provides a very dramatic illustration of the extraordinary and remarkable influence of the addition of very small amounts of the Teflon 6 agent to compositions which are used in specific end use applications illustratively in this case in wire insulation. The applicants believe that these improvements could be imparted to other products and other polymer systems used in other end use applications as, for example, in tires. This conclusion is presented on the basis of these examples and on the awareness of the inventors that the abrasion resistance is associated with wear resistance and that by the addition of relatively small percentages of polyethylene, such as the low density polyethylene of Examples 5A, 5B and 5C, or the high density polyethylene of Example 5D below, dramatic increases in the wear resistance of rubber articles such as tires may be achieved where the relatively low percentage addition of the polyolefin is accompanied by the addition of a very small amount of the uniquely fibrous fluorocarbon blending agent taught in this invention.

In addition to the observation of the improvement in the abrasion resistance, there is also observation of an increase in the tensile and an increase in the elongation properties of the material with the addition of small quantities of the uniquely fibrous fluorocarbon agent to form an interdispersion of a smaller portion of polyethylene in a larger portion of the ethylene propylene rubber base polymer.

EXAMPLE 5D

The composition as described in Example 5A, 5B and 5C was prepared, but with a modification in its polymer content. In fact, the composition is identical with that in Example 5B except that the 10 parts of low density polyethylene of Example 5B was replaced with 10 parts of high density polyethylene and, specifically, 10 parts of high density polyethylene identified commercially as TR-955 of the Phillips Company. This high density polyethylene had a density of 0.955 and a melt index of 8. The composition of this Example 5D also contained the 1.5 parts of fluorocarbon.

After a wire was coated with the composition as described in the Example 5D, the wire insulation was tested for abrasion resistance and a value of abrasion resistance obtained is shown in Table III. It is evident that the abrasion resistance with the high density polyethylene is substantially higher than that with the low density polyethylene for the same percentage of polyethylene intermixed in the EPR and for the same quantity of PTFE interdispersing agent. Specifically, the value of 928 for the composition 5D containing 10% HDPE is approximately 132% greater than the abrasion resistance for the composition of Example 5B containing 10% LDPE. In addition, it is approximately 300% greater (specifically, 295%) than the value found for the composition of Example 5A and, accordingly, the abrasion resistance value measured by the same test for the composition 5D shows a remarkable increase in abrasion resistance from the addition of the relatively small percentage of approximately 10 parts of high density polyethylene and the relatively small quantity of approximately 1.5 parts of Teflon 6 to the rubber base polymer, i.e., to the EPDM.

It should be pointed out that although there is some tolerance of the rubber for low density polyethylene, and a certain small percentage of low density polyethylene can be incorporated in the rubber, although without achieving the total homogeniety, nevertheless, the rubber, particularly the EPDM, is essentially incompatible in the higher ratios both with the low density polyethylene of Examples 5B and 5C, and with high density polyethylene of the character employed in this Example 5D. It would not be possible to combine 10 parts of high density polyethylene with 90 parts of EPDM using conventional processing equipment and procedures even with all of the ingredients the other additives of the Examples 5A–5D because of the basic incompatibility of these materials in this higher ratio.

Accordingly, it is very significant and unique that this homogeneous interdispersion of the combination of materials has been achieved with the aid of the PTFE interdispersing agent.

TABLE III

| INGREDIENTS | 5A | 5B | 5C | 5D |
|---|---|---|---|---|
| Low density polyethylene, Density = 0.92; Melt Index = 2.5; sold by City Service Co. under the trade designation EH497 | 10 | 10 | 10 | |
| High density polyethylene, Density = 0.955; Melt Index = 8; sold by Phillip Co. under the trade designation TR-955 | | | | 10 |
| Semi Crystalline Ethylene Propylene Copolymer, Sold by DuPont under the trade designation Nordel 2722 | 90 | 90 | 90 | 90 |
| Miscellaneous Additives | 100.5 | 100.5 | 100.5 | 100.5 |
| Polytetrafluoroethylene powder | 0 | 1.5 | 3 | 1.5 |

TABLE III-continued

| INGREDIENTS | 5A | 5B | 5C | 5D |
|---|---|---|---|---|
| supplied by DuPont under the trade designation Teflon 6 | | | | |
| Dicumyl peroxide curing agent available commercially from the Hercules Company under the trade designation Dicup R | 4 | 4 | 4 | 4 |

EXAMPLE 6

Several compositions were prepared in the manner similar to that described in Example 5. The ingredients included 20 parts of high density polyethylene for some of the compositions, and 30 parts of high density polyethylene for other of the compositions with the remainder being an EPDM copolymer or, more specifically, a terpolymer elastomer made from ethylene-propylene diene monomer. The compositions were prepared essentially as described in Example 5 and each contained 1.5 parts of Teflon 6.

The compositions were, in fact, quite similar to the composition of Example 5D in that the combination of high density polyethylene and an EPDM copolymer were interdispersed according to Example 5D and according to this example. In Example 5D, 10 parts of the high density polyethylene were employed whereas in this example 20 and 30 parts of the EPDM were employed. The testing of the peroxide crosslinked composition, which had been extruded onto wire as described in Example 5D, gave abrasion test values of 1135 strokes and 1471 strokes, respectively, for the interdispersed composition containing 1.5 parts of PTFE and 20 parts of high density polyethylene and 1.5 parts of PTFE and 30 parts of high density polyethylene. Accordingly, it is seen that the most rapid increase in the abrasion resistance of the interdispersed composition which results from the interdispersion of the high density polyethylene occurs with the first 10% addition of high density polyethylene into the interdispersed composition aided by the 1.5 parts of PTFE interdispersing agent.

EXAMPLE 7A

LDPE/HDPE

Fifty parts of low density polyethlyene were placed on a conventional small laboratory plastic mill having preheated rolls. The small laboratory mill had two rolls of about 3 inch diameter each and about 6 inches of exposed roll surface. One of the two rolls was rotated about 50% faster than the other to induce significant shearing of the milled material as it passed through the nip of the rolls. Heating was by heated oil passing through the interior of the rolls from conventional heating means.

A small quantity of less than about one part of an antioxidant, specifically Flectol H, was added to the banded low density polyethylene to inhibit oxidative degradation of the low density polyethylene.

After the polyethylene containing the antioxidant was banded on the mill, 50 parts of high density polyethylene were added to the nip of the rolls.

Some apparent blending of the low density polyethylene and high density polyethylene took place based on visual observation of changes to the two polymer ingredients, but the apparent blending was not at all complete.

EXAMPLE 7B 1.8 parts of Teflon 6 were added to the composition of Example 7A and a composition having an appearance and an apparent cohesion superior to those of Example 7A were observed. The applicants interpreted these improvements in composition appearance to evidence formation of at least partial interdispersion of the two polymers.

EXAMPLE 8A

LDPE/LLDPE

Fifty parts of low density polyethlyene were placed on a conventional small laboratory plastic mill as described in the previous example.

A small quantity of less than about one part of an antioxidant, specifically Flectol H, was added to the banded low density polyethylene to inhibit oxidative degradation of the low density polyethylene.

After the polyethylene containing the antioxidant was banded on the mill, 50 parts of linear low density polyethylene were added to the nip of the rolls.

Some apparent blending of the low density polyethylene and linear low density polyethylene took place based on visual observation of changes to the two polymer ingredients, but the apparent blending was quite limited.

EXAMPLE 8B 1.8 parts of Teflon 6 were added to the composition of Example 8A and a composition having an appearance and an apparent cohesion superior to those of Example 8A were observed to form. The applicants interpreted these improvements in composition appearance to evidence formation of at least partial interdispersion of the two polymers.

EXAMPLE 9

HDPE/PVC

The procedures and apparatus of the prior example were employed to determine by visual observation whether a blend and whether an interdispersion formed from the combination of a binary pair of ingredients on a heated plastic mill as set forth below.

EXAMPLE 9A

An attempt to blend high density polyethylene and polyvinyl chloride in a 50/50 ratio without Teflon 6 was made. Some very minor apparent blending took place.

EXAMPLE 9B 1.8 parts of Teflon 6 were added to the composition of Example 9A and further milling under the same conditions as used in Example 9A was carried out. Vastly improved homogeneity of the composition, improved appearance and cohesion were observed, thus indicating formation of an interdispersion.

EXAMPLE 10

LDPE/EPR

The procedures and apparatus of the prior examples were employed to determine by visual observation the effect of mixing on a plastic mill, as described in the examples above a combination of low density polyethylene and ethylene propylene rubber, both without and with interdispersing agents.

EXAMPLE 10A

An attempt was made to blend low density polyethylene and ethylene propylene rubber (EPDM 1145) in a 50/50 ratio on a plastic mill having rolls heated to 220° F. Some apparent blending took place.

EXAMPLE 10B

Example 10A was repeated, except ultra high molecular weight polyethylene (Hercules UHMWPE 1900, Intrinsic Viscosity 22, estimated molecular weight over 3 million) powder was added to the composition as an interdispersing aid. Some improvement in the appearance and apparent homogeneity and apparent processability was noted. This improvement indicated to the observer the formation of at least some interdispersion of the set of polymer ingredients.

Also noted was that a significant amount of the UHMWPE 1900 powder particles had not dispersed into the milling material.

EXAMPLE 10C

Example 10B was repeated, using a higher (300° F.) mill roll surface temperature. This temperature was intended to be well above the reported sintering temperature (about 265° F.). The properties of the composition were observed visually to be further improved over that of Example 10B.

EXAMPLE 10D

Example 10C was repeated, except that 1.8 parts of UHMWPE 1900 was replaced with 1.8 parts high molecular weight polyethylene (Hercules HMWPE HB 301, Intrinsic Viscosity 10, estimated molecular weight about one million). Visual improvement of the composition such as that observed in Example 10C was also observed in this example.

EXAMPLE 10E

The mill temperature was lowered to 220° F. and 2.5 parts of Dicip peroxide added to each of the above examples, followed by compression molding for 30 minutes at 350° F. into cured slabs.

EXAMPLE 11

LDPE/PVC

The procedures and apparatus of the prior examples were employed to determine by visual observation whether property improvement occurred from an attempt to blend and from an attempt to interdisperse a binary set of ingredients on a heated plastic mill as set forth below.

EXAMPLE 11A

An attempt was made to blend low density polyethylene and polyvinyl chloride in a 80/20 ratio on a 300° F. mill. Included was 1.5 parts of Flectol H and 10 parts dibasic lead phthalate. Very poor, if any, blending was observed to take place.

EXAMPLE 11B

Example 11A was repeated, except 1.8 parts of ultra high molecular weight polyethylene (Hercules UHMWPE 1900) was added as an interdispersing aid to the composition. Visual improvement in the composition properties was noted, along with improved handling characteristics. This visual improvement was interpreted to indicate the formation of an interdispersion.

EXAMPLE 11C

Example 11B was repeated, except that 1.8 parts of high molecular weight polyethylene (HMWPE Hercules HB 301) was used as the interdispersing aid. Again noted was visual improvement in the composition properties over those observed for the composition of Example 11A, along with improved handling characteristics. This visual improvement was also interpreted to evidence the formation of an interdispersion.

EXAMPLE 11D

The mill temperature was lowered to 240° F. and 1.5 parts of triallyl cyanurate plus 1.7 parts of Vulcup peroxide were added to each of the above examples. The composition was removed from the mill following milling, followed by compression molding for 30 minutes at 350° F. into cured slabs.

EXAMPLE 12A

HDPE/PTFE/UHMWPE/HMWPE

On a 300° F. mill was banded 100 parts of high density polyethylene and 1.5 parts of Flectol H to give a very soft mass of material which stuck tenaciously to the mill rolls. Then, Teflon 6 was added and distributed in increments to determine what level of Teflon 6 was needed at this hot 300° F. mill roll surface temperature to overcome the stickiness and to dry or unstick the material from the mill rolls for reasonable handling. It was found that the addition of 3.5 parts Teflon 6 to the high density polyethylene gave an acceptably low level of stickiness.

EXAMPLE 12B

Example 12A was repeated except that ultra high molecular weight polyethylene (UHMWPE Hercules 1900) was added and distributed in increments to determine what level of UHMWPE was needed to arrive at about the same lower level of stickiness or dryness as the 3.5 parts of Teflon 6. In overcoming stickiness of the HDPE material, it was found to be about 14 parts of UHMWPE.

EXAMPLE 12C

Example 12B was repeated except that high molecular weight polyethylene (Hercules SB 301) was used to overcome stickiness. It was found that about 20 parts of high molecular weight polyethylene were needed to approximate the level of dryness achieved by the 14 parts of UHMWPE in overcoming stickiness. Even then, the HMWPE did not seem to confer the same degree of "green strength" or handling properties as the UHMWPE.

EXAMPLE 13

Based on the results obtained in the earlier examples, it became apparent that the polytetrafluoroethylene (Teflon 6) was an effective, beneficial interdisperser of combinations of polymers, both as prepared and as crosslinked, both in absence and in presence of filler. The same Teflon 6 was employed in this example toward the interdispersing on a plastic mill of two polymers which normally are poorly blendable. In the present example, 50 parts of low density polyethylene are interdispersed with 50 parts of ethylene-propylene rubber (EPDM Nordel 1145). According to the experience of the applicants, the formation of a blend of these ingredients in this proportion is not feasible employing ordinary processing techniques.

EXAMPLE 13A

The 50 parts of low density polyethylene were banded on a two-roll mill of 220° F. roll surface temperature and 1.5 parts of Flectol H antioxidant was added to minimize shear degradation of the polymer.

Fifty parts of EPDM Nordel 1145 were added to the mill and although intermixed well and long, the composition would not form a smooth well-knit band, but rather formed a band with asperities and discontinuities and a rough, uneven appearance to the unaided eye.

Then, 2.5 parts of dicumyl peroxide were admixed into the composition, which admixture did not significantly change the texture or appearance of the material on the mill. Thus, from visual observation, it was apparent that good blending did not occur but that a rough textured semi-coherent band of the material was obtained.

This was removed from the mill and formed into a convenient flat piece for convenience of handling by quickly cooling under a flat metal surface. The sample was then weighed and one-quarter of the sample was removed by cutting and the quarter was retained as a sample. The sample had a rough, curd-like appearance, was fairly stiff, and broke or friated easily. There were curd boundaries evident and there were openings in the sample measuring approximately $\frac{1}{8}$ inch in diameter extending entirely through the sample.

EXAMPLE 13B

The three-quarters of the sample remaining was rebanded on the hot mill and 1.8 parts of the polytetrafluoroethylene were added based on the weight of the material on the mill. It was observed that the composition became much more dense and better knit than the Example 13A. When removed from the mill and flattened into a sheet, the sample appeared very coherent and was able to be flexed without any fracture or breaking off of portions of the sample. This demonstrated that the polytetrafluoroethylene clearly served as an interdispersing aid to interdisperse the components in the 50/50 proportion which had been demonstrated in Example 13A to be incompatible and poorly blendable at best. The proportions of the parts per hundred are listed in the Table for Example 13.

The material was weighed and one-third was removed by cutting and this cut portion was retained as a sample.

EXAMPLE 13C

The remaining two-thirds was rebanded on the same hot mill. It was noteworthy that rebanding was accomplished much more readily than was the material of Example 13A. Then, twenty parts of treated clay, Translink 37, were easily incorporated into and uniformly dispersed throughout the material banded on the mill. The sample was then removed from the mill, formed into a convenient flat piece, weighed, and one-half retained as a sample.

EXAMPLE 13D

The remaining half was rebanded on the hot mill and an additional twenty-five parts of the clay were added to the material on the mill and worked on the mill until the composition had achieved apparent uniformity of distribution of the clay filler. The resulting composition had a total of 45 parts of clay along with the other ingredients as listed in the table. Then, the material was removed from the mill, flattened and saved.

One general observation drawn from the Example 13 is that the banding or rebanding of an attempted blend or mix of the low density polyethylene with ethylene-propylene rubber is a difficult process. When the process is compared to an effort to accomplish the same rebanding by placing a sample having the polytetrafluoroethylene already distributed in the sample onto a mill, it is apparent that the material containing the polytetrafluoroethylene processes and handles much better. The presence, in other words, of the polytetrafluoroethylene in the composition makes the workability and in this case the rebanding of material on a mill much simpler and more expeditious. The Applicants view such improved rebanding ability as indicative of much greater cohesion of the gross piece which is believed to persist down through the molecular domain indicating improved intermingling of molecules of the different polymer types making up the interdispersion formed.

EXAMPLE 13C

Another apparent difference between samples which contain PTFE and those which do not is that when the cold material without the PTFE was placed on the hot mill to be re-banded, it quickly fragmented and fell off the rolls and the fragment needed tedious cycling by hand until the fragments softened and banded. However, when the same material contained 1.8 parts of Teflon 6, it underwent rebanding much more easily by entering into the nip of the roll with little or no fragmentation and allowing itself to be gradually melted right onto the roll. This is a much better "re-banding" of the original material, or better feeding, re-fluxing, and re-melting characteristics.

This indicates that there will be a much better behavior of the material fluxing and extruding than is the case where the Teflon 6 is absent and that the addition of only a very small amount of PTFE to interdispersed polymers to be processed will result in significant processing improvements as equivalents of the processing improvements observed in the examples below.

Well interdispersed polymer material does undergo very extensive stretching and where such a material contains a peroxide crosslinking agent dispersed therein, it is deemed possible to stretch the material into a thin film or into a fiber and to crosslink the film or fiber by the heating of the stretched composition to a temperature above the decomposition temperature of the contained peroxide.

| TABLE FOR EXAMPLE 13 | | | | |
| --- | --- | --- | --- | --- |
|  | 13A | 13B | 13C | 13D |
| Low density polyethylene, Exxon LD 83.9 pellets | 50 | 50 | 50 | 50 |
| Ethylene-propylene rubber, sold by Du Pont under the trade designation Nordel 1145EPDM | 50 | 50 | 50 | 50 |
| Antioxidant additive, polymerized trimethyl dihydroquinoline, sold under the trade designation Flectol H | 1.5 | 1.5 | 1.5 | 1.5 |
| Dicumyl peroxide curing agent available commercially from the | 2.5 | 2.5 | 2.5 | 2.5 |

-continued

TABLE FOR EXAMPLE 13

| | 13A | 13B | 13C | 13D |
|---|---|---|---|---|
| Hercules Company under the trade designation DiCup R | | | | |
| Polytetrafluoroethylene powder supplied by DuPont under the trade designation Teflon 6 | | 1.8 | 1.8 | 1.8 |
| Mineral Filler Additive (silicone treated clay as described in U.S. Pat. No. 3,148,169) and supplied by Freeport Kaolin Corp. under the trade designation Translink 37 | | | 20 | 45 |

EXAMPLE 14

LDPE/EPR/NR

A set of ingredients were prepared for processing on the mill as described in the above examples.

EXAMPLE 14A

Thirty-three parts of low density polyethylene were fluxed on a two roll mill having a 220° F. mill roll surface temperature and Flectol H antioxidant was added. Thirty-three parts of ethylene-propylene rubber were then added to the fluxing low density polyethylene on the mill, giving a composition on the mill which resembled that of Example 7A.

2.5 parts of dicumyl peroxide were then added to the fluxing low density polyethylene and ethylene-propylene rubber on the mill and were blended into the composition. It still retained the coarse, curdy, poorly knit appearance of the composition of 7A.

Thirty-three parts of natural rubber were added to the composition banded on the mill. It was observed that the character of the banded composition on the mill changed from the coarse, rough, poorly knit, curdy material to a smooth, homogeneous, dense, cohesive composition which milled nicely and that this occurred in a relatively short time and in a manner somewhat analogous to the way in which the PTFE brought the coarse, curdy composition of sample 13A into the smooth, cohesive, dense composition of sample 13B.

It was also observed that there was a similarity between the character of the material banded on the mill in its grain effect, i.e., the tendency to display greater resistance to stretching in the mill roll peripheral direction as contrasted with a lateral or roll axis direction and the grain effect of the material of sample 7A, and in the degree of extensibility of the material, particularly when worked with an implement such as a mill knife, in order to work the batch in a normal manner of bringing the outer edges of the composition in toward the center and the like.

As used herein, the term "grain effect" means a very distinctly visually observable orientation of the material on the mill, preferentially in the mill direction. The grain effect may be illustrated, for example, by placing a tool under one edge of the material and then wedging the tool away from the surface of the mill and having the composition ride out from the mill over the tool and back onto the mill, showing a strong cohesiveness of the material in the direction in which it is being milled.

Another illustration is that if the mill is stopped and a lateral cut is made in the direction axial to the mill roll, the tendency of the material to pull back from the cut surface and to separate, giving an opening of the cut as it is performed, occurred both with the PTFE-bearing materials of the earlier examples and with the natural rubber-bearing material of this Example 14A. This similar behavior of the two different materials leads to a possible conclusion that there is a relationship between the materials which relate to this grain effect or orientation of the materials of the composition.

From observation of this sample 14A in its behavior on the mill without any PTFE content and from observation of a sample such as 14B which did have PTFE, it was concluded that the surprising blending together of the non-cohesive, curdy, coarse composition of Example 14A both responsive to the PTFE in very small percent of approximately 1.8 parts and to the natural rubber in substantially high percentage of 33 parts, may arise from a similar mechanism which relates to the interaction on a molecular scale of the natural rubber with the two ingredients and similar interaction of the PTFE with the two dissimilar ingredients, namely, the low density polyethylene and the ethylene-propylene rubber, of sample 13A.

In this example, it is deemed by the inventors that an interdispersion of low density polyethylene and ethylene propylene rubber was induced by the addition of the natural rubber at the 50% level relative to the polymer ingredients to be interdispersed.

EXAMPLE 14B

The composition of Example 14A was removed from the mill and formed into a convenient flat piece which was then weighed and one-fourth of the material was removed and saved as a sample.

The remaining three-fourths of the composition of 14A were placed on the mill and banded to flux smoothly on the mill. 1.8 parts of polytetrafluoroethylene were added to the composition on the mill and it was observed that this PTFE was absorbed very rapidly into the composition which was banded on the mill. Both the takeup of the PTFE and the dispersion of the PTFE in the composition were quite rapid in comparison to the other samples to which the PTFE was added in like quantity.

The composition of Example 14B was removed from the mill. It was observed in removing the material from the mill that the cutting of the material against the grain and in the direction parallel to the roll axis gave a separation of the sample similar to that which occurred for Example 14A and that the difference between the separation as occurred in this example and that which occurred in 14A was not great as contrasted with the great difference which did occur when PTFE was added to 13A to form 13B.

It was observed as the material fluxed on the mill that there were no nodes formed parallel to the axis of the rolls, nor were there any string-like structures stretching across the nodes inasmuch as there were no nodes formed. This was a distinct difference from the composition of Example 13B which did show both the nodes running parallel to the nip of the rolls and also the string-like structures which were perpendicular to the nodes.

The sample 14B was removed from the mill and quickly formed into a convenient flat piece.

The piece formed in Example 14B was weighed and one-third of the piece was removed and saved as a sample for test and observation.

EXAMPLE 14C

The remaining two-thirds of sample 14B was rebanded on the hot mill and 20 parts of Translink 37 (silicone treated calcined clay filler) were added and distributed therein, after which the material was removed and formed into a convenient flat piece.

After the additive was completely interdispersed, and the material worked on the mill for a time, the sample was removed, quickly formed into a flat piece and weighed.

EXAMPLE 14D

One-half of the material produced as Example 14C was removed and the remainder was rebanded on the hot mill. Then, 25 additional parts of the treated clay were added to bring the total in Example 14D to 45 parts of treated clay. After working to uniformity, the material was removed, quickly formed into a flat piece and saved as a sample.

| TABLE FOR EXAMPLE 14 | | | | |
|---|---|---|---|---|
| | 14A | 14B | 14C | 14D |
| Low density polyethylene, sold by Exxon under the trade designation LD-83.9 | 33 | 33 | 33 | 33 |
| EPDM rubber sold by E. I. DuPont under the trade designation Nordel 1145 | 33 | 33 | 33 | 33 |
| Natural Rubber | 33 | 33 | 33 | 33 |
| Antioxidant additive, polymerized trimethyl dihydroquinoline, sold by Monsanto Chemical Corp. under the trade designation Flectol H | 1.5 | 1.5 | 1.5 | 1.5 |
| Dicumyl peroxide curing agent available commercially from the Hercules Company under the trade designation DiCup R | 2.5 | 2.5 | 2.5 | 2.5 |
| Polytetrafluoroethylene Powder supplied by DuPont under the trade designation Teflon 6 | | 1.8 | 1.8 | 1.8 |
| Mineral Filler Additive (silicone treated clay as described in U.S. Pat. No. 3,148,169) and supplied by Freeport Kaolin Corp. under the trade designation Translink 37 | | | 20 | 45 |

EXAMPLE 15A

LDPE/Neoprene

Using the procedure of Example 13, a composition was prepared on a mill to contain 50 parts of low density polyethylene, 50 parts of chloroprene, Neoprene type W, as well as 1.5 parts of Flectol H, 2.5 parts of dicumyl peroxide, 3.0 parts of dibasic lead phthalate. A rough surface was observed indicating poorly mixed or blended constituents. The composition was taken from the mill and one-fourth was removed.

EXAMPLE 15B

The remaining three-fourths was placed back on the hot mill, rebanded, and 1.8 parts of Teflon 6 were added and dispersed therein. A noticeable improvement in the texture of the material on the mill was observed, indicating that greater homogeneity of the composition was achieved with the addition of the Teflon 6.

The reduction of the coarse texture and improvement in composition appearance was taken to be evidence of formation of an interdispersion of the host polymers.

EXAMPLE 15C

The material was removed from the mill and one-third was taken off and saved as a sample and the remaining two-thirds was returned to the mill. Twenty parts of Translink clay were added as described in earlier examples and were found to blend well into the composition.

EXAMPLE 15D

The composition was again removed from the mill and half of it was saved as a sample and the remaining half was rebanded on the hot mill. Twenty-five additional parts of Translink 37 clay were added and were observed to incorporate well into the composition, after which the material was removed and saved as a sample.

EXAMPLE 16A

The procedure of Example 15 was repeated but, in this case, the dibasic lead phthalate constituent was omitted. In all other respects, the procedure of Example 15 was repeated. The sample of material prepared without the Teflon 6 ingredient was observed to be coarse and rough and somewhat lumpy in character.

EXAMPLE 16B

The samples prepared with the Teflon 6 showed evidence of greater homogeneity and the formation of an interdispersion.

EXAMPLE 17A

LDPE/SBR

The procedure as described in the previous example was again repeated, but in this case, the polymer ingredients of the test were low density polyethylene and styrene-butadiene rubber in a 50:50 ratio. It was observed that the sample which was prepared without the Teflon 6 had a rough and uneven character and from visual observation had poorer uniformity of dispersion of the ingredients thereof.

EXAMPLE 17B

By contrast, the samples which were prepared to contain the Teflon 6 evidenced smoother and apparently more homogeneous and uniform compositions. This change in the appearance of the compositions from rough to homogeneous was interpreted as the inducement by the PTFE of the formation of an interdispersion.

EXAMPLE 18

LDPE/Silicone Gum

The procedure of the previous example was repeated in all respects other than that the ingredients which were placed on the mill in the 50/50 ratio were low density polyethylene and silicone gum, particularly, SE-33 silicone gum commercially available from the General Electric Company.

EXAMPLE 18A

The procedures as described in the previous example and examples were repeated and it was observed that the sample which was prepared without the Teflon ingredient had a much more uneven and non-homogeneous appearance based partly on the surface irregularities and apparent lumpiness of the ingredients.

EXAMPLE 18B

By contrast, the samples prepared to contain 1.8 parts of Teflon 6 were observed to be much smoother of surface and were apparently much more homogeneous in their composition.

EXAMPLE 19

LDPE/Block Copolymer

The procedure described with reference to the previous example and examples was again repeated in all respects, except that the polymeric constituents were low density polyethylene and a block copolymer of styrene and butadiene, specifically Kraton G-1652 (available commercially from the Shell Oil Company). The composition of the first portion (19A) which omitted the Teflon 6 was somewhat rougher and drier in its appearance from the material which did not contain the Teflon 6 (19B) to the extent of 1.8 parts.

Moreover, on the mill, the portion (19B) which contained the Teflon 6 was observed to be very strong in comparison to the sample 19A which did not contain the Teflon. The samples 19B, C and D could be drawn out and stretched much more easily than sample 19A and, in fact, the sample 19A would separate and break if an attempt were made to extend it and pull it into a film form to the same degree that the sample 19B, for example, was stretched and pulled.

A noteworthy observation is that the presence of block copolymer of styrene and butadiene appeared to enhance the rate at which Teflon 6 was taken up and dispersed.

EXAMPLE 20A

LDPE/PVC

Fifty parts of low density polyethylene were placed on a mill of about 270° F. roll surface temperature and thereupon fluxed into a continuous band while 1.5 parts of Flectol H antioxidant were added to stabilize the polymer against shear degradation.

Then, 50 parts of powdered polyvinyl chloride (Goodrich Geon 30 PVC) were added along with ten parts of dibasic lead phthalate, which functions as a stabilizer for PVC. The result was a mixture composed of the white original fine PVC particles, distributed throughout the molten polyethylene matrix. The mixture cut very easily with a mill knife, and cuts made axially to the rolls did not tend to open further, indicating a low order of strength and extensibility. When removed from the mill and cooled, the mixture seemed grainy, rough to the touch, and easy to break. Even without magnification, the separate original particles of PVC were readily apparent. The sample was weighed and one-half removed and saved.

A sample of such a 50/50 LDPE/PVC composition, when pressed into a slab and cut into a long strip of about equal width and thickness, can be ignited at one end and when so ignited and held in a vertical position with the flame at the upper end, will continue to burn and will not self extinguish.

EXAMPLE 20B

The remaining half of the sample was rebanded on the same 270° F. mill and 1.8 parts of powdered polytetrafluoroethylene, available commercially as Teflon 6, were then added to the material on the mill. The composition rapidly changed in appearance from grainy to smooth and after a thorough distribution and filtration of the PTFE had taken place, the sample was removed from the mill. Under 10×magnification, the surface of the composition was very smooth and the very prominent display of original PVC particles which had been present in Example 20A were gone, evidently well interdispersed with the polyethylene.

The occurrence of dynamic nodes in the nip of the mill rolls was observed in Example 20B, but was not observed in Example 20A. By manipulating the nip clearance, the nodes could be made to form and dynamically bridging across such nodes could be seen very fine cobweb-like filaments. By stopping the mill and gently cutting out a portion of the nip area, which was allowed to carefully cool, it was possible to get a permanent "stop-action" specimen showing these ultra-fine bridging elements for study and characterization.

It is the Applicant's experience that polyvinyl chloride (PVC), such as is used in this example, has a normal processing temperature which is between 350° F. and 400° F., depending on the processing being carried out, and that a processing to form a blend of PVC with another material would normally be above 370° F. or higher, i.e., PVC with chlorinated polyethylene.

However, as is made evident by this example, the interdispersing of PVC with polyethylene according to the method and teaching of this invention is at a temperature about one hundred degrees below the anticipated temperature at which PVC is usually blended with some other ingredient with which it is naturally compatible and blendable. There are very few materials with which PVC will form natural blends and chlorinated polyethylene is one of the very few.

PVC is believed to be a relatively highly glassy polymer having a wide softening temperature range rather than a classical melting point at which a material abruptly becomes highly fluid. The PVC polymer itself tends to decompose rather than to melt to a low viscosity fluid state as the temperature is raised.

Pursuant to the present invention, PVC as illustrative of more glassy polymers is interdispersed at temperatures below the normal working or processing temperature of such polymers by addition of a small amount of PTFE to the glassy polymer and by interdispersing with another polymer, in this illustrative example with low density polyethylene.

Accordingly, this example suggests that the more glassy polymers can be interdispersed with other polymers with the aid of PTFE. It also teaches that the effective processing temperatures of more glassy polymers can be lowered in the formation of the interdispersion of PVC and low density polyethylene (LDPE) pursuant to this example at a temperature about one hundred degrees below the normal blending temperature.

In a separate interdispersing of PVC powder in LDPE as described above, it was found that an effective interdispersion could be formed at a roll surface temperature of 255° F. While on the mill, the composition also displayed the increased tendency to stretch into film. Also, when the banded composition containing the PTFE dispersed therein in fibrous form was cut axially to the mill roll with a mill knife, the cut edges separated spontaneously and drew back slightly, thus indicating extensibility and a tension in the interdispered composition extending circumferentially around the mill roll.

A sample of such a 50/50 LDPE/PVC composition which has been interdispersed with PTFE and formed into a long strip of dimensions about the same as those described in Example 20A and by the same method was ignited and held in a vertical position with the flame at the upper end. In contrast with the results found in Example 20A, the composition of this Example 20B self extinguished. Also, when reignited, the interdispersed composition again self extinguished.

EXAMPLE 20C

Approximately one-half of the sample prepared in accordance with Example 20A was cut from the sample and placed on the mill at approximately 220° F. mill roll temperature. After the material had reached temperature equilibrium and was fluxing on the mill, 1.4 parts of a peroxide curing agent, specifically Vulcup R, was added to the mill and was introduced uniformly by the mill agitation into the composition.

After uniform distribution of the peroxide in the sample, it was removed from the mill and flattened to a flat sample on a hard work surface. It was then introduced into a compression molding press, preheated to a temperature of 350° F. The sample was sandwiched between the two mylar sheets as is conventional practice in pressing such samples in a compression molding press. The pressing was continued for approximately 30 minutes at the 350° F. temperature and then the mill was allowed to cool with the sample in place to about room temperature with the aid of cooling water on the press. The slab sample thus produced measured approximately 4 inches by 4 inches. The cured slab was removed and was observed to have a generally mottled gray appearance. Close examination of the sample revealed that there are many, many black specks which are visible to the unaided eye. There were also white specks as well as some bluish-colored areas associated with and generally surrounding the black specks, both of which were visible to the unaided eye and at 10×magnification. There is some overall appearance of non-uniform coloration of the material, principally because of different concentrations of the black specks and blue areas in different locations of the sample surface.

On an approximate basis, the black specks and some blue colored areas are deemed to correspond roughly to the occurrence of the white specks in the sample 20A before the curing step. The white specks in sample 20A are undispersed PVC particles and these particles retain to a large degree the generally spherical or particulate shape which they had when they were introduced into the material in Example 20A.

EXAMPLE 20D

Approximately one-half of the material prepared in accordance with Example 20B was placed on a mill having a surface roll temperature of about 220° F. and was fluxed on the mill until thermal equilibrium had been reached.

The material on the mill was fluxed at the 220° mill temperature. It was observed that this material, although it had originally been prepared at 270° mill temperature to uniformly disperse the ingredients, nevertheless was refluxed at the lower 220° temperature without any evidence of segregation, exfoliation or separation of the ingredients thereof during the fluxing on the mill.

After the material was fluxed until an essentially uniform temperature had been achieved, 1.4 parts of a peroxide curing agent, specifically Vulcup R, was added to the material in the mill and distributed into the composition by the milling action on the composition. After the peroxide was uniformly distributed into the composition, it was removed from the mill and pressed on a hard work surface to a flat sample. The sample was then introduced into and heated in a compression molding press at 350° F. for approximately 30 minutes, sandwiched between two mylar sheets. The mill was cooled by internal water flow to approximately room temperature before the sample was removed from the press. Visual observation of the sample prepared in accordance with Example 20C and that prepared in accordance with this Example 20D revealed that whereas the 20C sample was gray, having small blue-colored areas, having non-uniformity of color, having black specks and having white specks which were apparent both with the unaided eye and with magnification, that the sample prepared pursuant to this Example 20D appeared to be an attractive apricot or flesh color, generally light in shade and clear in complexion to the unaided eye. The sample was highly flexible and did not give any evidence of breaking with folding and other manipulation and appeared fairly stiff. This is in contrast to the material of Example 20C which broke easily when folded.

EXAMPLE 20E

The overall procedure that gave Example 20D was repeated with the one exception that there was an additional constituent added, namely 1.5 parts of triallyl cyanurate (TAC). The overall outcomes of 20E and 20D were highly similar. The TAC crosslinking coagent is believed to enhance the covulcanization of the PVC with the polyethylene.

| TABLE FOR EXAMPLE 20 | | | | | |
| --- | --- | --- | --- | --- | --- |
|  | 20A | 20B | 20C | 20D | 20E |
| Low density polyethylene, sold by Exxon under the trade designation 83.9 | 50 | 50 | 50 | 50 | 50 |
| Polyvinyl chloride, sold by Goodrich under the trade designation Geon 103 | 50 | 50 | 50 | 50 | 50 |
| Dibasic lead phthalate | 10 | 10 | 10 | 10 | 10 |
| Antioxidant additive, polymerized trimethyl dihydroquinoline, sold by Monsanto Chemical Corp. under the trade designation Flectol H | 1.5 | 1.5 | 1.5 | 1.5 | 1.5 |
| Polytetrafluoroethylene powder supplied by DuPont under the trade designation Teflon 6 |  | 1.8 |  | 1.8 | 1.8 |
| Peroxide crosslinking agent, sold by Hercules Company under the trade designation Vulcup R |  |  | 1.4 | 1.4 | 1.4 |
| Triallyl cyanurate (TAC) |  |  |  |  | 1.5 |

EXAMPLE 21

LDPE/PVC; 50/50

The procedures and materials used in Example 20A and 20B were repeated but, in this example, UHMWPE (ultra high molecular weight polyethylene) was used in place of PTFE.

EXAMPLE 21A

Fifty parts of low density polyethylene were placed on a mill with a roll surface temperature of about 300° F. and fluxed to a band. 1.5 parts of Flectol H antioxidant were milled into the polyethylene.

Fifty parts of powdered polyvinyl chloride (Goodrich Geon 30 PVC) were added to the polyethylene fluxing on the mill together with ten parts of dibasic lead phthalate.

A mixture formed as described in Example 20A and was removed from the mill. A portion was saved for use in Example 21B.

A portion of the sample 21A was pressed into a slab and an elongated strip of about equal thickness and width was cut from the slab. Two markings were placed on the strip separated by 25 millimeters.

The strip was ignited above the upper mark and the strip was held with the flame at the top. A measurement was made of the time it took for the flame to burn down the strip between the two marks.

In a first test, the composition self extinguished after 39 seconds after 6 millimeters had burned and remained to be burned. One drop formed and dropped during the first burning period.

The strip was reignited and burned down an additional 11 millimeters before again self extinguishing. Another drop had formed and fallen during the second burning period which lasted until 108 seconds total had passed.

The strip was reignited and burned down the remaining 8 millimeters of the initial 25 millimeters. A total lapsed time of 132 seconds for burning the entire 25 millimeters was recorded.

Two additional strips was similarly burned and the results are listed in the Table for Example 21.

| | TABLE FOR EXAMPLE 21A | | | | | | |
|---|---|---|---|---|---|---|---|
| TEST | IGNITION* | | | | | | Cumulative |
| SAM- | FIRST** | | SECOND*** | | THIRD | | Burning Time |
| PLE | mm | sec. | mm | sec. | mm | sec. | To 25 mm |
| 21A-1 | 19 | 39 | 8 | 108 | | | 132 seconds |
| 21A-2 | 13 | 54 | | | | | 90 seconds |
| 21A-3 | 18 | 43 | 14 | 58 | | | 103 Seconds |

*Ignition was made by a hand held flame, i.e. a conventional butane cigarette lighter.
**The first ignition was made when the test strip had its full 25 millimeter length. For sample 21A, after 39 seconds of burning, 19 mm of the original 25 mm remained unburned.
***The second ignition was made after the burning strip self extinguished for the first time. For sample 21A, the second ignition was made when 19 mm of the test strip remained. It took 108 seconds to burn down to an 8 mm length.

EXAMPLE 21B

A composition as prepared in Example 21A was prepared to contain the ingredients as set forth in Example 21A, but in addition, contained 1.8 parts of ultra high molecular weight polyethylene.

The composition was noticeably smoother in its appearance and apparently more homogeneous.

After mixing, the composition was pressed into a slab and strips having a length of over 25 mm and about an equal thickness and width were prepared to correspond to the dimensions of the test strips of Example 21A. From another example in this application, it was known that a quantity of ultra high molecular weight polyethylene about 3 or 4 times greater than the polytetrafluoroethylene used in Examples 20A and 20B was needed to induce a level of "drying" of the molten, sticky high density polyethylene equivalent to that induced by the lesser quantity of PTFE.

Nevertheless, 1.8 parts of ultra high molecular weight polyethylene were included in the composition of this example. Burn tests were conducted as described in Example 21A and the results obtained are set forth in the Table below.

| | TABLE FOR EXAMPLE 21B | | | | | | | | |
|---|---|---|---|---|---|---|---|---|---|
| | SELF EXTINGUISHMENTS | | | | | | | | CUMULATIVE |
| | 1 | | 2 | | 3 | | 4 | | BURNING TIME |
| TEST SAMPLE | mm | sec. | mm | sec. | mm | sec. | mm | sec. | TO REACH 25 mm |
| 21B-1 | 18 | 41 | 11 | 83 | 7 | 101 | 3 | 109 | 113 seconds |
| 21B-2 | | | | | | | | | 113 seconds |
| 21B-3 (very thin sample) | 13 | 31 | | | | | | | 53 seconds |

As is evident from the contents of this Table, the results of adding 1.8 parts of ultra high molecular weight polyethylene are not uniform for the three tests made. The average burning time is less than that reported in Table 21A, but the sample 22B-3 here was a very thin sample and its burning time is apparently lower than normal.

It should be realized also that unlike polytetrafluoroethylene, ultra high molecular weight polyethylene is itself a combustible material so that the addition of this material to a composition containing 50 parts PVC and 50 parts LDPE actually increases the amount of combustible component in the resultant interdispersion.

However, from the tests reported in another Example, less UHMWPE was used in this Example 21B than would be needed to form a more complete interdispersion.

In this regard, see Example 21C below.

EXAMPLE 21C

The compositions and procedures as carried out in Example 21B were repeated, but with the exception that instead of 1.8 parts of ultra high molecular weight polyethylene interdispersing agent as used in Example 21B, the amount used in this Example 21C was 3.6 parts or double that employed in the previous example.

Three test strips were prepared as described in Example 21A and subjected to test burning also as described in Example 21A. The test results are set forth in the Table below.

| TABLE FOR EXAMPLE 21C | | | | | | | | | | | | |
|---|---|---|---|---|---|---|---|---|---|---|---|---|
| | IGNITION* | | | | | | | | | | | Cumulative |
| | FIRST** | | SECOND*** | | THIRD | | FOURTH | | FIFTH | | SIXTH | Burning Time |
| TEST SAMPLE | mm | sec. | mm | sec. | mm | sec. | mm | sec. | mm | sec. | mm sec. | To 25 mm |
| 21C-1 | 19 | 39 | 17 | 49 | 9 | 88 | 8 | 96 | 3 | 105 | | 120 seconds |
| 21C-2 | 18 | 37 | 16 | 47 | 12 | 67 | 8 | 94 | 4 | 133 | | 152 seconds |
| 21C-3 | 18 | 60 | 16 | 65 | 7 | 110 | 3 | 128 | | | | 135 seconds |

The test results are interpreted to demonstrate that the interdispersion of PVC and LDPE with the aid of 3.6 parts of UHMWPE is a composition which has a much higher tendency to self extinguish and which has a higher cumulative burning time than the control Example 21A. This result is obtained inspite of the fact that the composition of sample 21C has 3.6 more parts of combustible hydrocarbon than the control sample 21A. Test sample 21C actually contains 51.7% hydrocarbon and is more flame resistant than the control sample 21A which contains only 50% hydrocarbon. Or, to put it another way, the interdispersed composition of this Example 21C is more flame retardant because of its demonstrated greater tendency to self extinguish than the mixed composition of Example 21A which actually contains more PVC flame retardant.

For control Example 21A, the average cumulative time to burn the 25 mm of the test samples is 108.3 seconds. For test Example 21C, the equivalent average burning time is 135.7 seconds.

In addition, the control samples of Example 21A self extinguished two times before burning of the full 25 mm strip was completed. For test Example 21C, the test samples self extinguished five times before burning of the full 25 mm strip was completed.

Accordingly, this Example 21 demonstrates that improved flame retardance can be achieved for a composition containing a polymeric flame retardant by forming an interdispersion of the flame retardant polymer with a combustible polymer employing a combustible interdispersing agent.

EXAMPLE 22

HDPE/EPR

The procedure used in the previous Example 21 and similar examples was employed again and, in this case, the composition contained 50 parts of high density polyethylene and 50 parts of ethylene propylene rubber (Nordel EPDM 1145). This Example 22 also contained 1.5 parts of Flectol H throughout, as did essentially all other examples which included polyethylene.

This example is similar to that of the Example 1 with the exceptions that:
(1) the proportions of the high density polyethylene to the ethylene-propylene rubber are higher and in this Example 22 are 50 parts of each, and
(2) the fillers which were present in the Example 1 are omitted.

EXAMPLE 22A

The Example 22A was prepared by milling as described in the earlier examples, had no filler and also had no Teflon 6. No appreciable blending was observed.

EXAMPLE 22B

The Example 22B included Teflon 6 but included no filler. An essentially homogeneous interdispersion was observed to form.

EXAMPLE 22C

The Example 22C included 1.8 parts of Teflon 6 but also included 20 parts of Translink clay. The filler dispersed well and easily into the composition of Example 22B.

EXAMPLE 22D

The Example 22D included 1.8 parts of Teflon 6 and also 45 parts of clay. This further amount of clay filler dispersed well into the composition of Example 22C.

EXAMPLE 22E

The procedure as described in Example 22B was repeated but the effort was made to reduce the temperature at which the processing was carried out. The attempt to gain a lower processing temperature gained perhaps 5°-10° F. in lower processing temperature and was successful at this lower temperature. The results obtained are essentially the same as those reported with regard to Example 22B above.

EXAMPLE 23

Linear low density polyethylene was processed on a plastic mill with and without Teflon 6. The commercial identification of the linear low density polyethylene was LPX-2.

EXAMPLE 23A

The initial material prepared, identified as sample 23A, did not contain any Teflon 6. The mill roll temperature for the processing was about 235° F. The linear low density polyethylene had a very sharp melting point at low viscosity and was quite sticky after melting.

A sample of the material was removed from the mill and saved for use in Example 23E.

EXAMPLE 23B 1.8 parts of Teflon 6 were added to the linear low density polyethylene processed according to Example 23A. There was a marked change in the appearance of the material as compared to that of 23A, and there was an improvement in its rheology which was similar to the improvement which occurs when Teflon 6 is added to high density polyethylene on a mill.

EXAMPLES 23C AND 23D

In Example 23C, 20 parts of the Translink clay were added and blended well into the composition. In Example 23D, an additional 25 parts of Translink clay and also blended well into the composition.

EXAMPLES 23E and 23F

After the preparation of the first two of these materials, i.e., 23A and 23B, they were returned to the mill individually and peroxide was added and, specifically, 1.4 parts of Vulcup R were added to each of the samples and the samples were then placed in the press and heated at 350° F. for a period of about 30 minutes to form a pressed cured slab. The slab was allowed to cool in the pressing apparatus through the internal cooling of the press.

The tensile and elongation properties of slabs formed for Examples 23E and 23F were measured and are included in the table for this example.

| TABLE FOR EXAMPLE 23 | | |
|---|---|---|
| | 23E | 23F |
| Linear low density polyethylene, sold by Exxon Chemical under the trade designation LPX-2 | 100 | 100 |
| Antioxidant additive, polymerized trimethyl dihydroquinoline, sold by Monsanto Chemical Corp. under the trade designation Flectol H | 1.5 | 1.5 |
| Peroxide crosslinking agent, sold by Hercules Company under the trade designation Vulcup R | 1.4 | 1.4 |
| Polytetrafluoroethylene powder supplied by DuPont under the trade designation Teflon 6 Mill mixed @ 235° F. mill temperature Cured @ 350° F. for 30 minutes and cooled under pressure MAT # 33666 | — | 1.8 |
| Original Tensile, psi | 2826 | 3358 |
| Original Elongation, % | 476 | 643 |

EXAMPLE 24A, 24B, 24C and 24D

The procedure used in the Example 23 was repeated but, in this case, instead of using 100 parts of linear low density polyethylene, 100 parts of ethylene propylene rubber and, particularly, the Nordel 1145, were employed. The compositions 24A, 24B, 24C and 24D were prepared as in the Example 23.

EXAMPLE 24E, 24F, 24G and 24H

This was followed by the addition of 1.4 parts of Vulcup R to each of these samples and the heat curing of the samples into a slab as described in the above examples.

Tensile and elongation of Samples 24E and 24F were measured and are given in the Table for this example. Both the tensile and elongation of the crosslinked EPR were increased about 50% by the addition of the fibrous PTFE.

| TABLE FOR EXAMPLE 24 | | |
|---|---|---|
| | 24E | 24F |
| EPDM rubber sold by E. I. Du Pont under the trade designation Nordel 1145 | 100 | 100 |
| Antioxidant additive, polymerized trimethyl dihydroquinoline, sold by Monsanto Chemical Corp. under the trade designation Flectol H | 1.5 | 1.5 |
| Peroxide crosslinking agent, sold by Hercules Company under the trade designation Vulcup R | 1.4 | 1.4 |
| Polytetrafluoroethylene powder supplied by DuPont under the trade designation Teflon 6 Mill mix @ 235° F. mill temperature Cured @ 350° F. for 30 minutes and cooled under pressure MAT # 33666 | — | 1.8 |
| Original Tensile, psi | 287 | 428 |
| Original Elongation, % | 206 | 316 |

EXAMPLE 25

LLDPE/EPR

The composition and procedures described with reference to Example 23 and 24 were repeated but, in this case, the polymers which were treated were the combination of linear low density polyethylene identified in Example 23 and also the ethylene propylene rubber or EPDM of Example 24 which was identified as Nordel 1145.

EXAMPLE 25A

The same sequence of treatment steps was used. The composition of Example 25A, which was prepared without any Teflon 6, showed a marked coarseness and roughness at its surface and was distinct in this respect from the sample A of Example 23 and from the sample A of Example 24.

EXAMPLE 25B

The Example 25B was prepared by the same procedure as that used in preparation of 25A, but in this case, contained 1.8 parts of Teflon 6. There was a very marked and distinct improvement in the appearance of the sample due to the presence and influence of the Teflon 6 additive. This improvement in appearance was deemed to evidence the formation of an interdispersion of linear low density polyethylene and ethylene propylene rubber with the aid of the PTFE, Teflon 6.

EXAMPLE 25C and EXAMPLE 25D

Example 25C involved the addition of 20 parts of Translink clay to the material prepared according to Example 25B.

Further, the Example 24D involved the further addition of 25 parts of Translink clay to the composition of 25C for a total of 45 parts of Translink clay.

EXAMPLES 25E, 25F, 25G and 25H

Each of these samples was returned to the mill at a temperature suitable for addition of peroxide and 1.4 parts of peroxide, Vulcup R, were added to each of the samples separately. This was followed by a pressing of the samples to heated slabs in a press at 350° F. and for a period of 30 minutes, followed by cooling to room temperature.

Test results for sample 25E and for sample 25F were obtained. The results evidence a dramatic improvement in tensile properties for the sample 25F containing the fibrous Teflon 6 additive. This improvement is attributed to the presence of fibrous Teflon 6 in sample 25B and also to the greater homogeneity of the interdispersion of the two polymers induced by the presence of the fibrous Teflon 6 during the process of interdispersing the relatively incompatible linear low density polyethylene with and into the ethylene propylene rubber.

TABLE FOR EXAMPLE 25

|  | 25E | 25F |
|---|---|---|
| Linear low density polyethylene, sold by Exxon Chemical under the trade designation LPX-2 | 50 | 50 |
| EPDM rubber sold by E. I. Du Pont under the trade designation Nordel 1145 | 50 | 50 |
| Antioxidant additive, polymerized trimethyl dihydroquinoline, sold by Monsanto Chemical Corp. under the trade designation Flectol H | 1.5 | 1.5 |
| Peroxide crosslinking agent, sold by Hercules Company under the trade designation Vulcup R | 1.4 | 1.4 |
| Polytetrafluoroethylene powder supplied by DuPont under the trade designation Teflon 6 | — | 1.8 |
| Mill mix @ 235° F. mill temperature Cured @ 350° F. for 30 minutes and cooled under pressure MAT # 33666 |  |  |
| Original Tensile, psi | 1453 | 2483 |
| Original Elongation, % | 426 | 550 |

EXAMPLE 26A

Pursuant to the present invention, a composition containing 40 parts of polyvinyl chloride together with 40 parts of chlorinated polyethylene, and 20 parts of polyethylene were combined on a mill heated to 220° F. Twenty-five parts of dibasic lead phthalate were also included in the composition along with 1.5 parts of Flectol H.

The samples were prepared as described in the above examples and the Example 26A composition was milled without any Teflon 6 additive.

EXAMPLE 26B

A sample 26B was prepared to include precisely the same ingredients in the same ratios as disclosed for Example 26A. The composition was milled on a mill heated to 270° F. with no Teflon 6 additive.

The difference between the two samples was that the sample 26A was milled at a mill roll surface temperature of 220° F., whereas sample 26B was milled at a mill roll temperature of about 270° F. The temperature of 270° F. mill roll temperature is far below the temperature at which ingredients such as those above would be blended or an attempt would be made to blend them in commercial manufacture of a product. In fact, the temperature was approximately 80°–100° F. lower than the temperature conventionally used in the process of blending of the above composition.

EXAMPLE 26C

Sample 26C was prepared to contain the same ingredients as 26A and 26B, but 26C also contained 1.8 parts of Teflon 6. The composition of 26C was prepared in the same manner as the 26B composition and was also milled at a mill roll temperature of 270° F.

When sample 26A was observed on the mill, all particles of the PVC constituent were undispersed. By contrast, the composition of Example 26B did show a distinct improvement over that of 26A in that there was significant amount of dispersion of the PVC particles in the composition.

Nevertheless, it was also apparent that much of the PVC in Example 26B was not dispersed.

By contrast, the Example 26C showed a relatively homogeneous composition with a good and preferred distribution and dispersion of the ingredients in one another in the form of a homogeneous interdispersion.

EXAMPLE 26D, 26E and 26F

After milling, each of the compositions were individually removed from the mill and were saved and were later individually returned to the mill and 1.7 parts of Vulcup R were added to each one. The mill roll temperature had, in each case, been dropped and was at about 250° F. Each of the compositions was blended until the peroxide constituent was absorbed into the composition and it was then removed from the mill and placed on a press where it was pressed for approximately 30 minutes at 350° F. to press and cure each sample. The peroxide cured samples 26D, 26E and 26F are those which were initially prepared respectively as 26A, 26B and 26C. The sample 26D had a very gray appearance made up of many fine dark dots and small blue colored areas showing what is deemed to be the deterioration of the original undispersed polyvinyl chloride.

The slab of example 26E had a distinctly salmon color in contrast with the gray color of 26D, and did nevertheless evidence many fine, fine particles of evidently deteriorated PVC from the limited distribution of PVC which had occurred in the composition.

By contrast again, the composition of 26F was smooth and fairly light-colored, but with no visible evidence of deteriorated PVC evident to the unaided eye. This example illustrates the interdispersing together in a single operation and with a single mixing, of a plurality of diverse polymer components to achieve a high degree of homogeneity in the interdispersed ternary polymer composition product where the Teflon 6 interdispersing agent is employed.

The above observations are reinforced by the following tensile tests on the cured slabs:

|  | SAMPLE 26D | SAMPLE 26E | SAMPLE 26F |
|---|---|---|---|
| Mill Roll Temperature: | 220 | 270 | 270 |
|  | No PTFE | No PTFE | With PTFE |
| Tensile, psi | 930 | 1734 | 2371 |
| Elongation, % | 85 | 130 | 160 |

In addition, the accomplishment of this dispersion of PTFE and interdispersion of ternary polymer composition of Sample 26F occurs at a temperature which is below the temperature at which the material might otherwise undergo blending.

It is, of course, evident in the plastics field that any appreciable reduction in the time during which and temperature at which a polymer is exposed during processing is advantageous.

TABLE FOR EXAMPLE 26

|  | 26D | 26E | 26F |
|---|---|---|---|
| Polyvinyl chloride | 40 | 40 | 40 |
| Chlorinated polyethylene | 40 | 40 | 40 |
| Polyethylene | 20 | 20 | 20 |
| Polytetrafluoroethylene powder supplied by DuPont under the trade designation Teflon 6 | — | — | 1.8 |
| Dibasic Lead phthalate | 25 | 25 | 25 |
| Antioxidant additive, polymerized | 1.5 | 1.5 | 1.5 |

-continued

| TABLE FOR EXAMPLE 26 | | | |
|---|---|---|---|
| | 26D | 26E | 26F |
| trimethyl dihydroquinoline, sold by Monsanto Chemical Corp. under the trade designation Flectol H | | | |
| Peroxide crosslinking agent, sold by Hercules Company under the trade designation Vulcup R | 1.7 | 1.7 | 1.7 |

EXAMPLE 27

CONCENTRATES

EXAMPLE 27A

A sample of 100 parts natural rubber smoked sheet was placed on a mill and Teflon 6 was gradually added to the composition to the point where the milling of the composition became poor due to the high level of the Teflon in the natural rubber. This material contained about 6 parts of the Teflon at the time when the poor milling was observed for this sample.

EXAMPLE 27B

A sample of 100 parts high density polyethylene was placed on a mill and milled and Teflon 6 was gradually added to the composition on the mill to the point where the milling of the composition became poor due to the high concentration of the Teflon. It was observed that approximately 12 parts of Teflon 6 could be added to high density polyethylene on the mill before the milling was so poor as it was in the case of Example 27A.

EXAMPLE 27C

A composition of 50 parts natural rubber and 50 parts of high density polyethylene were placed on the mill and were milled in the presence of Teflon 6. Additions of Teflon 6 were made gradually to determine the extent to which the Teflon 6 could be added without having the composition loose its good milling properties. It was found that approximately 25 parts of Teflon 6 could be added to the interdispersion on the mill before the composition lost its good milling properties to the degree also found in the Examples 27A and 27B. On a percentage basis, the 25 parts of Teflon 6 added to sample 27C amounts to 20% of the composition formed.

It is pointed out in this Example 27A that there is a maximum level of PTFE that can be incorporated into the natural rubber before the composition exhibits the poor millability behavior. It was determined in Example 27A to be 6 parts per 100 parts of natural rubber, or 3 parts of PTFE per 50 parts of natural rubber.

Similarly, the maximum level of PTFE which can be incorporated into the high density polyethylene is 12 parts of PTFE per 100 parts of high density polyethylene as evidenced in Example 27B. In other words, 3 parts of PTFE is the maximum level for 50 parts of natural rubber and 6 parts of PTFE is the maximum level for 50 parts of high density polyethylene based on the limit of reaching poor millability.

Accordingly, a composition which consists of 50 parts of natural rubber and 50 parts of high density polyethylene should have the maximum incorporable level of PTFE of 9 parts.

Surprisingly and unexpectedly, the composition containing the 50/50 parts of natural rubber and high density polyethylene can incorporate 25 parts of PTFE before exhibiting the poor millability characteristics.

Clearly, it is suggested that the composition matrix is neither that of the natural rubber nor high density polyethylene, but rather something quite unique and novel in that it can accept 25 parts of PTFE. It is suggested that an interdispersion of natural rubber and high density polyethylene has produced something unexpected.

These conclusions are reached partly on the basis that the interdispersion of 50/50 natural rubber and high density polyethylene accepted about 270% of the PTFE that was expected to be accepted based on the amount of PTFE which was accepted by the individual materials separately and when not part of an interdispersion as provided pursuant to this invention.

EXAMPLE 28A

PE/PVC; 80/20

Eighty parts of low density polyethylene were blended on a mill with 20 parts of polyvinyl chloride as set forth in the Table for Example 20. 1.5 parts of Flectol H and 1.5 parts of triallyl cyanurate were added. The material, which contained no PTFE, was fluxed on the mill together with 10 parts of dibasic lead phthalate until an apparently uniform composition was achieved. The sample 28A was taken off the mill and half was reserved for Example 28B.

Half of the sample taken from the mill was returned to the mill and fluxed at a lower temperature and 1.7 parts of Vulcup R were added as indicated in the Table.

The product of the fluxing was removed from the mill and pressed at 350° F. for 30 minutes and cooled while in the press. A sample was taken from the slab thus prepared and tensile and elongation values were measured. The averages of values are given in the Table below under Example 28A.

EXAMPLE 28B

The half of the sample which had been reserved from Example 28A was placed on the mill and 1.8 parts of Teflon 6 were added to the material on the mill as indicated in the Table for the initial fluxing. The temperature was dropped and Vulcup R was added to the extent indicated in the Table and the fluxing was continued. The milled sample was removed from the mill and pressed in a plastic press to a slab at 350° F. for 30 minutes. The tensile and elongation properties were measured and are shown in the table under Example 28B.

It is evident from comparison of the results obtained with regard to Example 28A, that a dramatic improvement was made in the tensile property and that there was also some improvement also in the elongation property simply as a result of the inclusion of the 1.8 parts of Teflon 6 in the example.

| TABLE FOR EXAMPLE 28 | | |
|---|---|---|
| INGREDIENTS | 28A | 28B |
| Low density polyethylene, sold by Exxon Company under the trade designation LD83.6 | 80 | 80 |
| Polyvinyl chloride, sold by Goodrich Company under the trade designation Geon 30 | 20 | 20 |
| Antioxidant additive, polymerized trimethyl dihydroquinoline, sold by Monsanto Chemical Corp. under the trade designation Flectol H | 1.5 | 1.5 |
| Triallyl cyanurate | 1.5 | 1.5 |
| Peroxide crosslinking agent, sold by Hercules Company under the trade | 1.7 | 1.7 |

-continued

| TABLE FOR EXAMPLE 28 | | |
|---|---|---|
| INGREDIENTS | 28A | 28B |
| designation Vulcup R | | |
| Polytetrafluoroethylene Powder supplied by DuPont under the trade designation Teflon 6 | — | 1.8 |
| Dibasic lead phthalate, sold by Associated Lead Corp. under the trade designation Dythal | 10 | 10 |
| Original Tensile, psi | 1449 | 2486 |
| Original Elongation, % | 80 | 210 |

EXAMPLE 29A
LDPE/PP

Approximately 85 parts of low density polyethylene and 3.0 parts of Flectol H were placed on a mill having a mill roll temperature of 300° F. Fifteen parts of polypropylene pellets (Amoco Avison 10-1016) were added. The composition did not blend together. Rather, the polypropylene pellets retained their identity within the molten polyethylene matrix and did not enter into a mingling or blending with the low density polyethylene. Half of the composition was then removed from the mill. No tests were made of this composition because of the non-homogeneity of distribution of the constituents.

EXAMPLE 29B 1.8 parts of Teflon 6 were added to the remainder of the composition on the mill prepared as described in Example 29A. The polypropylene pellets dispersed fairly rapidly into the low density polyethylene to form an interdispersion which appeared homogeneous and which was removed pending lowering of mill temperature.

This blend of 85 parts of low density polyethylene and 15 parts of polypropylene was rebanded onto the mill rolls at 220° F. and 1.4 parts of Vulcup R were incorporated therein, followed by removal and press-curing for 30 minutes at 350° F. The tensile and elongation of the slab composition was measured and the results obtained are in the Table below.

An apparently homogeneous crosslinked composition was obtained.

EXAMPLE 29C 100 parts of low density polyethylene, 1.5 parts of antioxidant and 1.8 parts of PTFE were milled at 220° F. and 2.5 parts of dicumyl peroxide were added and milled into the composition. The composition was removed from the mill and a pressed slab was prepared by pressing the composition at 350° F. for 30 minutes followed by cooling in the press.

Measurements were made of the modulus and tensile and elongation and the values determined are set forth in the table for Example 29.

| TABLE FOR EXAMPLE 29 | | |
|---|---|---|
| | 29B | 29C |
| 20% Modulus, i.e., stress in psi @ 20% elongation | | 1217 |
| 50% Modulus, i.e., stress in psi @ 50% elongation | 1700 | |
| 100% Modulus, i.e., stress in psi @ 100% elongation | 1700 | 1453 |
| 200% Modulus, i.e., stress in | 1700 | 1463 |
| psi @ 200% elongation | | |
| Ultimate - tensile in psi | 2300 | 2879 |
| Ultimate - elongation in % | 460 | 379 |

The composition of Example 29B had substantially higher modulus values, particularly in the low modulus range, and had fairly constant low modulus values as is evident from the table for Example 29.

EXAMPLE 30A

Fifty parts of low density polyethylene were placed on a small mill which had been preheated to a mill roll temperature of about 310° F. The low density polyethylene was allowed to heat until pellets showed signs of melting and the polyethylene was banded on the mill and fluxed to thermal equilibrium as had been done for the other examples employing polyethylene on a mill. 1.9 parts of Flectol H antioxidant were added and blended into the low density polyethylene, also as carried out in the other examples employing polyethylene. After the composition had reached equilibrium, fifty parts of polystyrene were added to the mill and gradually worked into the polyethylene which was fluxing on the mill. The material had very little cohesiveness but much adhesiveness and tended to stick to the mill, and had to be removed from the mill rolls by scraping with the aid of a razor blade.

A generally beige composition which seemed to break very easily by rough hand evaluation was formed as an apparent blend of the two ingredients. The sample was weighed and approximately one-half was retained as a sample.

EXAMPLE 30B

The other half was placed back on the 310° F. mill and 1.8 parts of polytetrafluoroethylene were incorporated into the material distributed in the material banded on the mill.

While Example 30B was somewhat sticky coming off the mill rolls, it was vastly improved of Example 30A not only in decreased stickiness, but also in much better strength for handling.

Also, there was some noticeable difference in the flexibility and strength of the sample 30B as compared to 30A from rough hand testing of bulk material and of shaved specimens. The tests were very qualitative but nevertheless yielded some indication of improved physical properties of this interdispersion containing Teflon 6, particularly the friability of the material.

The cooled sample broke rather cleanly without strong visual evidence to the unaided eye of an extensive network of fibers in the composition.

| TABLE FOR EXAMPLE 30 | | |
|---|---|---|
| | 30A | 30B |
| Low density polyethylene | 50 | 50 |
| Polystyrene (Fosterene) | 50 | 50 |
| Antioxidant additive, polymerized trimethyl dihydroquinoline, sold by Monsanto Chemical Corp. under the trade designation Flectol H | 1.9 | 1.9 |
| Polytetrafluoroethylene powder supplied by DuPont under the trade designation Teflon 6 | | 1.8 |
| Solubility in boiling toluene* | less than | over 20% |

-continued

TABLE FOR EXAMPLE 30

|  | 30A | 30B |
|---|---|---|
|  | 5 min. | undissolved after over 1 hour |

*See Example 31B

EXAMPLE 31

It is well known that the cumulative thermal history that the polymeric material experiences during the course of its route of preparation, processing and usage limits or impairs the useful life of an article formed from the material. Accordingly, it is beneficial in terms of useful life of a material to have it produced at the lowest optimum processing temperature for minimum chain scission and degradation. In other words, it is preferable to minimize the accumulation of heat history. Consequently, there is always a need for the improvement of processing operations, such as processing polymeric materials at reduced processing temperature. In this connection, see Examples 31A and 31B.

EXAMPLE 31A

The ingredients and procedures used in preparing sample 30A were repeated for Example 31A except that the mill had an approximate roll surface temperature of 240°–250° F.

The polystyrene pellets did not show significant indication of melting or blending into the polyethylene which had been banded on the mill. Rather, there were very wide openings, very large surface irregularities or asperities, clear evidence of the retention of the polystyrene in its pellet form in which it was placed on the mill and only little or very moderate evidence of the polystyrene being included into the composition being banded on the mill. While some of the pellets appeared to be included, that is, to have been enveloped by the polyethylene, they nevertheless showed only the most negligible indication of having become part of or having entered into a single composition. The composition was clearly heterogeneous to the unaided eye.

The material was removed from the mill and divided into equivalent halves.

EXAMPLE 31B

One-half of the mixture of polystyrene pellets interspersed in polyethylene which was removed from the mill in Example 31A was returned to the 240°–250° F. mill and 1.8 parts of the PTFE were incorporated. Rapidly, the polystyrene pellets disappeared into the polyethylene matrix and the composition appeared homogeneous. The composition had a generally buff or tan color and was easily removed from the mill showing none of the sticky property of the material which had been processed at the higher temperature by, especially, Example 30A.

The sample was removed from the mill and formed into a convenient flat piece.

When the cooled piece was bent, it was noticed that a light area developed along the bend and that the material did not break cleanly as the material of Example 30B did. In fact, the material appeared to fold in a manner similar to that of a "living hinge". In other words, the folded portion of the sheet could be folded and unfolded repeatedly without resulting in a clean break of the specimen along the fold line. A very extensive network of fibrous architecture was evident at and around the "living hinge" fold.

This example demonstrated that the temperature at which an interdispersion can be formed between a mostly glassy polymer such as polystyrene, and a highly crystalline polymer pursuant to this invention, by and with the aid of distributing PTFE in fine fibrous form in the composition, can be significantly below and, in this example, 60° to 70° F. below the temperature at which the materials entered an apparent interdispersion without the aid of the fibrous PTFE.

Since Example 31A never became a blend, it was omitted from the experiment following. Small strips were cut from the cooled samples of the blends represented by Examples 30A, 30B, and 31B, and the strips weighed, then put into boiling toluene. After 5 minutes, the 30A strip had disintegrated and dissolved, while the 30B and 31B strips resisted disintegration and dissolution to the extent that after one full hour in boiling toluene, the strips were still discernible and after removal from the toluene followed by complete toluene evaporation, the strips still had about one-third of original weight. Thus, although 30B and 31B represented blending at 240°–250° F. and 310° F., respectively, the order of polymeric entanglement of the blending aid fibrous PTFE appears reasonably similar.

TABLE FOR EXAMPLE 31

|  | 31A | 31B |
|---|---|---|
| Low density polyethylene | 50 | 50 |
| Polystyrene (Fosterene) | 50 | 50 |
| Antioxidant additive, polymerized trimethyl dihydroquinoline, sold by Monsanto Chemical Corp. under the trade designation Flectol H | 1.9 | 1.9 |
| Polytetrafluoroethylene powder supplied by DuPont under the trade designation Teflon 6 |  | 1.8 |
| Solubility in boiling toluene |  | 20% undissolved after more than one hour |

EXAMPLE 32A

LDPE/PEI

Fifty parts of low density polyethylene were fluxed on a mill as in earlier examples, and 1.5 parts of Flectol H were added. Pellets of polyetherimide, available commercially under the trade designation ULTEM ® of General Electric Company, were added to the fluxing low density polyethylene on the mill. The mill roll surface temperature was approximately 400° F. After fluxing for a period of time at this temperature, it became apparent that the polyetherimide did not blend into the composition. Half of the composition was removed from the mill and retained as a sample.

EXAMPLE 32B

To the remaining half of the composition on the mill, approximately 2.5 parts of Teflon 6 were added to the fluxing composition. The mill roll surface temperature was slowly raised to approximately 430° F., whereupon it was observed that the Ultem pellets which had a generally cylindrical in initial form, were becoming flat and stringing out and beginning to disappear. Also, a pronounced change in the viscosity of the material banded on the mill was noticed, in that it became much more stiff and viscous, indicating that ULTEM ® was being interdispersed with polyethylene. After these observations, the mill temperature was decreased gradually to about a mill roll surface temperature of about 220° F. At that temperature, the composition which remained banded on the mill was removed without difficulty and formed into a convenient flat sample.

From visual observation and from the experience in performing this experiment, it is estimated that an interdispersion of polyetherimide in polyethylene was formed with the aid of fibrous PTFE and that the ratio of the constituents was of the order of ten parts polyetherimide to 90 parts of polyethylene.

TABLE FOR EXAMPLE 32

| | 32A | 32B |
|---|---|---|
| Polyetherimide, sold by General Electric Company under the trade designation ULTEM ® | 50 | 50 |
| Low density polyethylene, sold by Exxon Corp. under the trade designation LD 83.9 | 50 | 50 |
| Antioxidant additive, polymerized trimethyl dihydroquinoline, sold by Monsanto Chemical Corp. under the trade designation Flectol H | 1.5 | 1.8 |
| Polytetrafluoroethylene powder supplied by DuPont under the trade designation Teflon 6 | — | 2.5 |
| Unified composition formed | none | 10 parts polyetherimide 90 parts polyethylene |

EXAMPLE 33A

LLDPE/PVC; 80/20

Eighty parts of linear low density polyethylene were blended on a mill with 20 parts of polyvinyl chloride. 1.5 parts of Flectol H and 1.5 parts of triallyl cyanurate were added. The material was fluxed on mill rolls heated to 235° F. together with 10 parts of dibasic lead phthalate until an apparently uniform composition was achieved. The sample was taken off the mill and half was saved for Example 33B. The sample taken from the mill was returned to the mill and fluxed at a lower temperature and 1.7 parts of Vulcup R were added as indicated in the Table for this Example 33.

The product of the fluxing was removed from the mill and pressed at 350° F. for 30 minutes and cooled while in the press. A sample was taken from the slab thus prepared and tensile and elongation values were measured. The averages of values are given in the Table below under Example 33A.

EXAMPLE 33B

The half of the sample which had been reserved from Example 33A was placed on the mill and 1.8 parts of Teflon 6 were added to the material on the mill as indicated in the Table below for the initial fluxing. The temperature was dropped and Vulcup R was added to the extent indicated in the Table and the fluxing was continued. The sample was removed from the mill and press cured in a plastic press to a slab at 350° F. for 30 minutes. The tensile and elongation properties were measured and are shown in the table under Example 33B.

It is evident from comparison of the results obtained with regard to Example 33A, that a significant improvement was made in the tensile property and that there was also some improvement also in the elongation property simply as a result of the inclusion of the 1.8 parts of Teflon 6 in the composition of Example 33B.

TABLE FOR EXAMPLE 33

| INGREDIENTS | 33A | 33B |
|---|---|---|
| Linear low density polyethylene, sold under the trade designation LPX-2 | 80 | 80 |
| Polyvinyl chloride, sold by Goodrich Company under the trade designation Geon 30 | 20 | 20 |
| Antioxidant additive, polymerized trimethyl dihydroquinoline, sold by Monsanto Chemical Corp. under the trade designation Flectol H | 1.5 | 1.5 |
| Triallyl cyanurate | 1.5 | 1.5 |
| Peroxide crosslinking agent, sold by Hercules Company under the trade designation Vulcup R | 1.7 | 1.7 |
| Polytetrafluoroethylene Powder supplied by DuPont under the trade designation Teflon 6 | — | 1.8 |
| Dibasic lead phthalate, sold by Associated Lead Corp. under the trade designation Dythal | 10 | 10 |
| Original Tensile, psi | 2634 | 3178 |
| Original Elongation, % | 265 | 295 |

EXAMPLE 34

PE/EPR; 50/50

This example discloses an attempt to have the polytetrafluoroethylene interdisperse low density polyethylene at a lower temperature than is conventionally used for blending or otherwise processing low density polyethylene.

EXAMPLE 34A

Ethylene propylene rubber was put on a mill at a surface temperature of about 190° F. 1.8 parts of PTFE were added to the composition and interdispersed into the EPR fluxing on the mill. Polyethylene pellets were then added to the material which was fluxing on the mill in a proportion of 50 parts of EPR and 50 parts of the low density polyethylene.

After the fluxing was efficiently in progress, the temperature of the mill was lowered and the material continued to flux on the mill. The temperature of the mill was dropped to about 170° F. and the composition at that point was cohesive enough to permit the addition of 2.1 parts of benzoyl peroxide as a powder. The powder dispersed easily into the composition fluxing on the mill. The composition which had been banding on the mill before the addition of the benzoyl peroxide was relatively dry, but nevertheless continued to retain its coherence and continued to flux on the mill in such manner that the benzoyl peroxide could be conveniently introduced into it.

This result is rather unique and unusual in that it permits the addition of the low temperature curing agent to a composition which contained polyethylene and in which the low temperature curing agent, namely benzoyl peroxide, could not normally be used.

Following the addition of the benzoyl peroxide, the sample was removed from the mill, put into a press and heated for 30 minutes at 350° F. and then allowed to cool while in the press.

This example is one of a number which illustrates the novel advantage of making possible secondary processing, in this case, benzoyl peroxide crosslinking, of interdispersed compositions containing ingredients which could not previously be processed at such low temperatures.

It is known that low density polyethylene cannot normally be crosslinked with benzoyl peroxide because the benzoyl peroxide decomposes at too low a temperature to be incorporated by fluxing in the low density polyethylene.

However, by interdispersing the low density polyethylene with EPDM as a primary processing step pursuant to this invention, and employing fibrous PTFE to form such an interdispersion, the use of the benzoyl peroxide is made feasible because of the unique and novel interdispersion of the EPDM and low density polyethylene and the low temperature at which this interdispersion fluxes when made pursuant to the present invention.

EXAMPLE 35A

PE/ Polyester

A mill was heated until its surface temperature was about 400° F. 100 parts of low density polyethylene were banded on the mill. Ten parts of Valox were added to the polyethylene banding on the mill. Three parts of Flectol H were also added as an antioxidant. The Valox pellets were observed to undergo no deformation or softening or blending with the polyethylene. The composition was removed from the mill, placed in a heated compression press at a temperature of 460° F., and kept there for 5 minutes. This heating was sufficient to melt the Valox pellets in the composition. After the melting of the Valox, the composition was removed from the heated press and quickly placed on the mill which still remained at about 400° F. and milling was continued until the material reached mill temperature.

The composition was again removed from the mill and put into the high temperature press at the temperature of 460° F. for a period of approximately an additional 5 minutes. After removal from the press, the material was again placed directly onto the mill which was in operation and at the temperature of about 400° F. and the material was further milled while the temperature of the composition remained above the temperature of the mill rolls.

This removal from the mill, heating in the high temperature press, and return to the mill was repeated twice more.

After these four treatments, the composition on the mill was changed very little, indicating very little blending had occurred.

EXAMPLE 35B

Example 35A was repeated, except 3.6 parts of Teflon 6 were initially present in the mixture, which presence resulted, after the series of millings and hot press heatings as recited in Examples 35A, in an essentially uniform interdispersion of Valox and polyethylene.

EXAMPLE 36

PE/PS; 50/50

A composition of 50 parts low density polyethylene and 50 parts polystyrene were banded on a mill with the aid of 1.8 parts of fibrous PTFE in the manner described in Examples 30B and 31B.

After the composition was well banded and apparently homogeneous at a temperature of about 240° F., 0.5 parts of dicumyl peroxide were added to the banded composition and interdispersed into the interdispersion of polyethylene and polystyrene as a co-grafting agent.

By co-grafting, as used in this application, is meant the inducing of a chemical linking of different polymer species as a secondary treatment. The primary treatment of this invention is the interdispersion of two otherwise incompatible polymers, i.e., the interdispersing of low density polyethylene and polystyrene at 240° F.

An ideal co-grafting would be the formation of a chemical bond between each pair or distinct molecules of the interdispersion to further reduce and eliminate the capability of the primary interdispersions to be dissolved by solvents which dissolve one or both components of the primary blend. As noted elsewhere, for example, with reference to the polyethylene/polystyrene primary interdispersions of this invention containing 1.8 parts of fibrous PTFE, they resist solution in boiling toluene and at least partially persist as interdispersions for more then 12 times longer than an apparent blend composition prepared at higher temperatures without the fibrous PTFE primary interdispersing agent.

The addition of a co-grafting agent as a secondary treatment pursuant to this example is to further increase the solvent resistance of the primary interdispersion of this invention. In this example, the peroxide co-grafting agent was added in an amount less than that usually added to cause full crosslinking in a static system, i.e., crosslinking by which the constituents are heated in a given form, as in the form of a wire insulating sheath or a slab in a press.

Rather, the peroxide was added as a co-grafting agent while the primary interdispersion was still being fluxed on a mill at a temperature below the decomposition temperature of the peroxide. To induce the co-grafting on a molecular scale, the temperature of the mill and of the primary blend fluxing on it, was raised to a temperature above the peroxide decomposition temperature as the primary interdispersion remained banded on the mill and as the mill continued to flux the primary interdispersion.

There was no distinct modification of the appearance of the primary interdispersion or of the fluxing of the interdispersion as the decomposition temperature of the peroxide was reached and passed. The sample was removed from the mill and saved for evaluation.

EXAMPLE 37

PVC/LDPE; Sioplas; 50/50

EXAMPLE 37A

This example is essentially a repeat of the procedure described with regard to Example 20 in that the composition employed is polyvinyl chloride blended with a low density polyethylene (LDPE), except that the LDPE used was a silane-grafted, moisture-curable version known commercially under the trade name Sioplas. Because the Sioplas undergoes a different curing mode, no peroxide was added to the blend compositions which otherwise followed the procedure of Example 20A. A poorly intermixed composition resulted with PVC particles distributed in the LDPE.

EXAMPLE 37B

The composition of Example 37A was divided and half was kept and the remainder was returned to the mill as sample 37B.

In preparing the blend 37B, it was observed that 1.8 parts of Teflon 6 greatly enhanced the interdispersion of PVC with silane-grafted polyethylene to form a smooth, apparently homogeneous composition with no apparent evidence of persistant PVC particles. The PVC interdispersed with the silane-grafted polyethylene in much the same fashion as the PVC was interdispersed with unmodified polyethylene as in Example 20B.

After the compositions 37A and 37B were prepared, 30 mil thick slabs were compression-pressed out at 400° F. for 10 minutes, followed by allowing the pressed slabs to stand on a laboratory bench for 2 days to allow ambient air moisture to permeate into the slabs. Thereafter, strips were cut from the slabs for samples 37A and 37B, and both strips showed good shape integrity after prolonged immersion in boiling toluene indicating that crosslinking by the grafted silane had occurred.

EXAMPLE 38A

PP/Silicone Gum; 50/50

A mill was heated to a mill roll temperature of 330° F. Fifty parts of silicone gum, available from General Electric Company under the trade designation SE-33, were placed on the mill and 50 parts of polypropylene were also placed on the mill. 1.5 parts of Flectol H was also added. Essentially no blending of the polypropylene with the silicone gum occurred.

EXAMPLE 38B

However, when 1.8 parts of Teflon 6 were added to the composition on the mill, the polypropylene interdispersed into the silicone gum to form a smooth, apparently homogeneous composition.

EXAMPLE 38C

The procedure of Example 38B was repeated using the silicone gum SE-33 and polypropylene in a ratio of 75 parts of silicone gum to 25 parts of polypropylene. The initial milling was at the 330° F. mill roll temperature. When a homogeneous blend had formed with the aid of the fibrous PTFE, the mill roll was lowered to a mill temperature to 230° F.

EXAMPLE 38D 1.4 parts of Vulcup R peroxide were then added to the composition as prepared in Example 38C. The composition was introduced into a press and was then compression-molded for 30 minutes at 350° F. to give a cured slab.

EXAMPLE 39A and 39B

HDPE/PVC; 80/20

The ingredients i.e., 80 parts polyolefin and 20 parts of PVC together with the other ingredients of the table for Example 33, were combined according to the procedures that were used in Examples 33A and 33B. However, in this Example 39, high density polyethylene (USI MA-778) was used in place of linear low density polyethylene (LPX-2) of Examples 33A and 33B.

Mill roll surface temperature of about 260° F. was used in the present Examples 39A and in 39B. Similar overall outcomes, showing improvements in Sample 39B over sample 39A due to inclusion of Teflon 6, were found visually before and after curing, as well as by physical testing.

For Example 39A without Teflon 6 and corresponding to Example 33A, the tensile and elongation results were 2748 psi and 240%, respectively. For Example 39B with Teflon 6, corresponding to Example 33B, the tensile and elongation results were 3095 psi and 300% respectively.

| TABLE FOR EXAMPLE 39 | | |
|---|---|---|
| SAMPLE | TENSILE | ELONGATION |
| 39A - No Teflon | 2748 | 240 |
| 39B - With 1.8 parts Teflon | 3095 | 300 |

EXAMPLE 40

PS/LDPE Sioplas; 50/50

EXAMPLE 40A

The ingredients and procedure as recited in Example 37A was repeated but with the exception that 50 parts of LDPE Sioplas was combined with 50 parts of polystyrene. The composition was prepared in the absence of PTFE on a mill having rolls preheated to 250° F. A poorly intermixed composition was obtained with PVC particles distributed in the Sioplas. The composition was removed from the mill and half was saved.

EXAMPLE 40B

The remaining half was returned to the mill and 1.8 parts of PTFE were added and the composition was fluxed on the mill at 250° F. A well interdispersed combination of Sioplas LDPE and polystyrene were formed with the aid of the PTFE.

The compositions of Examples 40A and 40B were pressed into slabs as described in Example 37 and the slabs were cured. Immersion in boiling toluene did not result in dissolution of the slab samples.

EXAMPLE 41

LDPE Sioplas/Silicone Gum' 50/50

Example 37 was again repeated except that the ingredients used were a 50/50 mixture of LDPE Sioplas and GE SE-33 silicone gum, using 220° F. mill roll surface temperature.

EXAMPLE 41A

Without Teflon 6, there was a very low level of any apparent blending.

EXAMPLE 41B

With 1.8 parts of Teflon 6, an interdispersion formed and exhibited greater homogeneity, cohesiveness and much better handling properties.

Corresponding slabs were compression pressed at 400° F. for further characterization.

EXAMPLE 42A

LDPE/Silicone Fluid; 100/5

One hundred parts low density polyethylene were banded with 1.5 parts Flectol H on a 220° F. mill. Five parts of Viscasil silicone fluid of 30,000 centistoke viscosity were then carefully added to the banded polyethylene. This added silicone fluid caused the banded material to crumble apart and fall from the mill rolls. Half of the crumbs were saved.

EXAMPLE 42B

The other half of the crumbs were put back into the mill nip. 1.8 parts of Teflon 6 were added and amazingly caused a re-agglomeration of the crumbs into a nicely milling band. The banded composition was removed and allowed to cool to room temperature. On standing, the composition displayed no tendency to exude (bloom) the silicone out of the cooled polyethylene.

This example demonstrates that it is feasible to interdisperse low molecular weight polymeric material with the aid of very moderate amounts of fibrous PTFE and accordingly demonstrates that other low molecular weight material can be interdispersed with the aid of moderate amounts of fibrous PTFE as demonstrated by the blending of low molecular weight material of this example.

Judging from the good appearance of the banded material of this example, and from the good appearance of the cooled slab, it was estimated that a substantially larger amount of the low molecular weight polymer could be successfully blended into and retained in the banded higher molecular weight polymer on the mill.

Also, it was estimated that higher concentrates of PTFE could improve the interdispersability of low molecular weight polymers.

EXAMPLE 42C

The procedure of Example 42A was repeated with 10 centistoke silicone fluid. Crumbling of the banded low density polyethylene and dropping from the mill occurred at the 2.5 part level.

EXAMPLE 42D

The crumbs could not be re-agglomerated—even with the addition of 5- and 10-parts Teflon 6 to the crumbs on the mill.

EXAMPLE 42E

The addition of 10 centistoke fluid to polyethylene banded on the mill was tried again, but this time by addition of the fluid to low density polyethylene which was milling with the 1.8 parts Teflon 6 already incorporated and dispersed therein. About 3 parts of 10 centistoke silicone fluid were all that could be added before the band fell apart and dropped from the mill.

The Applicants estimate that such 10 centistoke silicone fluid is of a molecular weight of about 600–1000. The Applicants further estimate that molecules or polymers of this order or size and weight is about the limit that 1.8 parts of Teflon 6 will ensnare or entangle or interdisperse into an ordinary low density polyethylene polymer matrix and thus permit and enhance combination therewith, which combination does not otherwise occur therewith.

EXAMPLE 43

PS/PVC; 50/50

The procedures and apparatus of the prior examples were employed to determine by visual observation whether a blend formed from the attempt to blend a binary pair of ingredients on a heated plastic mill as set forth below.

EXAMPLE 43A

An attempt to blend polystyrene and polyvinyl chloride in a 50/50 ratio without Teflon 6 was made. Questionable blending and unsatisfactory handling behavior were found to occur.

EXAMPLE 43B 1.8 parts of Teflon 6 were added to one-half of the composition of Example 43A. Satisfactory interdispersing and much improved handling behavior were observed for the resulting composition.

EXAMPLE 44

PS/PMA; 50/50

The procedures and apparatus of the prior examples were employed to determine by visual observation whether a blend formed from the attempt to blend a binary pair of ingredients on a heated plastic mill as set forth below.

EXAMPLE 44A

An attempt to blend polystyrene and polymethylmethacrylate in a 50/50 ratio without Teflon 6 was made. No apparent blending took place and a coarse, non-homogeneous mixture resulted.

EXAMPLE 44B 1.8 parts of Teflon 6 were added to one-half of the composition of Example 44A and an interdispersion was observed to form having homogeneity of appearance.

EXAMPLE 45

PC/PE; 50/50; 75/25

The procedures and apparatus of the prior examples were employed to determine by visual observation whether a blend formed from the attempt to blend a binary pair of ingredients on a heated plastic mill as set forth below.

EXAMPLE 45A

An attempt to blend Lexan polycarbonate and Valox polyester in a 50/50 ratio without Teflon 6 was made. Little, if any, blending progress appeared to take place under the relatively lower temperature conditions under which the ingredients were combined on a mill.

EXAMPLE 45B 1.8 parts of Teflon 6 were added to one-half of the composition of Example 45A and significant interdispersing progress was observed.

EXAMPLE 45C

An attempt to blend Lexan polycarbonate and Valox polyester in a 75/25 ratio without Teflon 6 was made. Little, if any, blending or combining progress appeared to take place on the lower temperature mill to which the ingredients were added.

EXAMPLE 45D 1.8 parts of Teflon 6 were added to the composition of Example 45C and significant apparent interdispersing progress was observed.

EXAMPLE 46

PS/PAC; 50/50

The procedures and apparatus of the prior examples were employed to determine by visual observation whether a blend formed from the attempt to blend a binary pair of ingredients on a heated plastic mill as set forth below.

EXAMPLE 46A

An attempt to blend polystyrene and Delrin polyacetal in a 50/50 ratio without Teflon 6 was made. No apparent blending took place.

EXAMPLE 46B 1.8 parts of Teflon 6 were added to the composition of Example 46A and an interdispersion was observed to form.

EXAMPLE 47

PS/PAM; 60/40

The procedures and apparatus of the prior examples were employed to determine by visual observation whether a blend formed from the attempt to blend a binary pair of ingredients on a heated plastic mill as set forth below.

EXAMPLE 47A

An attempt to blend polystyrene and a polyamid, specifically Nylon 11, in a 60/40 ratio was made without Teflon 6. Blending outcome appeared to be unsatisfactory, as judged visually and by poor cohesion.

EXAMPLE 47B 1.8 parts of Teflon 6 were added to half of the composition of Example 47A and the outcome appeared much improved, especially by showing good cohesion. It was concluded that an interdispersion was formed between the polystyrene and polyamid, specifically Nylon

EXAMPLE 47C

An attempt to melt Nylon 66 on the available laboratory mill was made but the nylon did not melt as the melting temperature of this nylon was too high.

An effort to blend and to interdisperse with polyethylene did not succeed. The failure to interdisperse was attributed to the limited temperature attainable on the laboratory plastic mill and the relatively high softening temperature of the particular nylon.

As indicated above, an interdispersion was formed with the aid of PTFE between polystyrene and the lower melting polyamid, Nylon 11.

EXAMPLES 48A, 48B, 48C, 48D

A low molecular weight polyethylene (MI30 USI FN500) was employed in Example 48A, without Teflon 6, was very soft and tended to be sticky on milling.

Example 48B, with 1.8 parts of Teflon 6, was significantly firmer and less sticky.

Examples 48C and 48D, which contained 1.8 parts of Teflon 6 as well as 20 parts and 45 parts, respectively, of Translink 37 clay were progressively firmer and less sticky.

Thus, this invention appears still operable at the low molecular weight range of FN500 and the effect of the PTFE on the low molecular weight polyethylene was taken to evidence the susceptibility of this composition to enter into interdispersions with other polymers.

EXAMPLES 48E, 48F, 48G and 48H

Peroxide curing agent was added to each of the above compositions and the above four compositions were compression molded for 30 minutes at 350° F. into cured slabs.

EXAMPLE 49

LDPE/HDPE; 50/50

The procedures and apparatus of the prior examples were employed to determine by visual observation whether a blend or interdispersion formed from the attempt to blend or interdisperse a binary pair of ingredients on a heated plastic mill as set forth below.

EXAMPLE 49A

An attempt to blend low density polyethylene and high density polyethylene in a 50/50 ratio without Teflon 6 was made. Some apparent blending took place though the composition was apparently not homogeneous.

EXAMPLE 49B 1.8 parts of Teflon 6 were added to half of the composition of Example 49A and the formation of an interdispersion was observed having improved appearance, homogeneity and cohesion.

EXAMPLE 50

CIPE/PP; 50/50

The procedures and apparatus of the prior examples were employed to determine by visual observation whether a blend or interdispersion formed from the attempt to blend or interdisperse a binary pair of ingredients on a heated plastic mill as set forth below.

EXAMPLE 50A

An attempt to blend chlorinated polyethylene and polypropylene in a 50/50 ratio without Teflon 6 was made. No apparent blending took place and a very coarse mixture of uneven texture with many openings extending through the composition was formed.

EXAMPLE 50B 1.8 parts of Teflon 6 were added to half of the composition of Example 50A and the formation of an interdispersion was observed having vastly improved appearance, apparent homogeneity and cohesion.

This composition is deemed suitable for use as formed as a jacketing and/or insulating material on wire and cable.

What we claim as new and desire to secure by Letters Patent of the United States is:

1. A composition of matter comprising a chemically crosslinkable interdispersion of a first polymer and a second polymer, said interdispersion (i) being at least partially formed with at least one polytetrafluoroethylene interdispersing agent and (ii) containing a peroxide crosslinking agent;

wherein the first polymer is selected from the group consisting of:
   low density polyethylene,
   high density polyethylene,
   linear low density polyethylene,
   ethylene/propylene copolymer, polypropylene
   ethylene/propylene/diene terpolymer,
   ethylene/vinyl acetate copolymer,
   ethylene/ethyl acrylate copolymer,
   chlorinated polyethylene, and
   chlorosulfonated polyethylene; and the second polymer is selected from the group consisting of:
polyetherimide,
polyester,
polyamide,
polyphenylene oxide,
silicone polymer,
polycarbonate, and
polyacetal.

2. The composition defined in claim 1 wherein the first polymer is an ethylene/vinyl acetate copolymer.

3. The composition defined in claim 1 wherein the first polymer is an ethylene/ethyl acrylate copolymer.

4. The composition defined in claim 1 wherein the second polymer is a polyetherimide.

5. The composition defined in claim 1 wherein the second polymer is a polyester.

6. The composition defined in claim 1 wherein the second polymer is a polyphenylene oxide.

7. The composition defined in claim 1 wherein the second polymer is a silicone polymer.

8. The composition defined in claim 1 wherein the second polymer is a polyacetal.

9. The composition defined in claim 1 wherein the second polymer is a polycarbonate.

10. The composition defined in claim 1 in a cross-linked state.

* * * * *